United States Patent
Wilson et al.

[19]

[11] Patent Number: 5,819,840
[45] Date of Patent: Oct. 13, 1998

[54] THERMOSTAT WITH OCCUPANCY DETECTOR

[75] Inventors: Don R. Wilson, 1522 Sunnyslope, Carrollton, Tex. 75007; Harvey Downing, Garland, Tex.

[73] Assignee: Don R. Wilson, Carrollton, Tex.

Related U.S. Application Data

[60] Provisional application No. 60/008,668 Dec. 15, 1995.

[21] Appl. No.: 766,293
[22] Filed: Dec. 13, 1996
[51] Int. Cl.⁶ .............................. G05D 23/00; F28F 27/00
[52] U.S. Cl. .............................. 165/11.1; 165/237; 236/47
[58] Field of Search ..................... 165/237, 11.1, 165/238; 236/47, 46 R

[56] References Cited

U.S. PATENT DOCUMENTS

| | | | |
|---|---|---|---|
| 4,174,064 | 11/1979 | Pratt, Jr. | 236/1 B |
| 4,284,126 | 8/1981 | Dawson | 236/51 X |
| 4,294,404 | 10/1981 | Gajjar | 236/94 X |
| 4,341,345 | 7/1982 | Hammer et al. | 236/46 R |
| 4,407,447 | 10/1983 | Sayegh | 236/49.3 |
| 4,505,426 | 3/1985 | Rossi et al. | 236/47 |
| 4,723,593 | 2/1988 | Kuribayashi | 165/11.1 |
| 5,119,987 | 6/1992 | Kobayashi | 236/49.3 |
| 5,148,977 | 9/1992 | Hibino et al. | 236/49.3 |
| 5,285,961 | 2/1994 | Rodriguez, Jr. | 236/47 |
| 5,318,224 | 6/1994 | Darby et al. | 236/47 |

*Primary Examiner*—William Wayner
*Attorney, Agent, or Firm*—Crutsinger & Booth

[57] ABSTRACT

An energy saving controller for an air conditioning system comprising a temperature sensor or sensing and measuring the temperature in an area to be controlled, a memory device for storing a first set and a second set of reference temperatures, each set of reference temperatures including a heating reference temperature and a cooling reference temperature, and a controller in communication with the memory device for selecting one of the first and second sets of reference temperatures in the memory and for comparing the selected set of reference temperatures to the measured temperature of the area. The controller is adapted to select one set of reference temperatures when the area is unoccupied by a person and to select the other set of reference temperatures when the area is occupied by a person. The occupancy information is provided to the controller by an occupancy detector. A system switch is provided that communicates with the controller and selects between a heating mode, a cooling mode, and an off mode. The controller is adapted to actuate a heating unit when the heating mode is selected by the system switch and when the measured temperature of the area falls substantially below the heating temperature set point or actuate a cooling unit when the cooling mode is selected by the system switch and when the measured temperature of the area substantially exceeds the selected cooling temperature set point.

16 Claims, 19 Drawing Sheets

Determine Which Data to Modify

– 1 –

THERMOSTAT WITH OCCUPANCY DETECTOR

CROSS REFERENCE TO RELATED APPLICATION

This application claims the benefit of U.S. Provisional Application No. 60/008,668, filed Dec. 15, 1995.

TECHNICAL FIELD

An appendix having a total of 42 pages of a computer program constitutes part of this specification of this invention.

This invention relates to thermostat control systems and, more specifically, to a thermostat control system that controls the temperature settings in a room based on the occupancy of the room.

BACKGROUND OF THE INVENTION

When an unoccupied hotel room, office or dwelling is cooled or heated to personal comfort levels, energy and money are being wasted. Conventional thermostats generally have a set of manual controls, requiring the occupant of the room or dwelling to manually adjust the settings to their needs. If the occupant also happens to be the owner of the premises, chances are that they will make a conscious effort to lower the settings when they leave the premises, as they are acutely aware of the needless costs of running a heating and cooling system when their premises are unoccupied. However, when the occupant of the room, office or dwelling is not the owner and does not have to pay for the cost of heating and cooling, chances are that they may not be quiet as conscientious. In fact, it is fairly safe to say that most non-owner occupants will make minimal or no effort to adjust the thermostat settings when they leave the room or premises unless they are personally responsible for the cost of heating or cooling the room, office, or premises.

In most hotels and corporate suites, the cost of heating and cooling is borne by the owner. In any given day, most hotel rooms and corporate suites are left unoccupied from ten to twelve hours. Rooms and suites are generally used primarily during the evening hours. Therefore, if the thermostats in the rooms are left at settings chosen by the occupant for their comfort, a tremendous amount of money and energy is spent needlessly every day.

SUMMARY OF THE INVENTION

A dual set-point thermostatic controller assembly for controlling gas, oil, or electric heaters with air conditioning is provided. The assembly operates as a conventional household thermostat, sensing the environment's temperature and activating a switch selected heating or cooling unit. Unlike other thermostatic controllers that operate to maintain an environmental temperature referenced to a single temperature, the thermostatic controller assembly disclosed herein is designed to automatically select one of two reference temperature sets. One reference temperature set is selected when the physical area to be environmentally controlled is occupied. The second reference temperature set is selected when the controlled area is unoccupied.

The dual set-point thermostatic controller assembly comprises a thermostat control unit and an occupancy sensing unit. The control unit comprises a micro-controller for controlling and actuating a heating and cooling unit, a set of display devices for displaying the temperature of the room and desired reference temperature, a segment driver that connects the micro-controller to the display devices and drives the display devices in response to the micro-controller, and a memory device, which is programmed to store an occupied reference temperature, an unoccupied reference temperature, and a time delay. The micro-controller receives input from several internal and external sources: temperature sensors, occupancy sensors, a fan switch, a power switch, a system switch, a key switch, a programming switch, and the memory device.

The micro-controller operates to select one of the two reference temperature sets by monitoring the occupancy sensor. The occupied reference temperatures, typically chosen by the occupant of the room, is selected by the micro-controller when the physical area to be environmentally controlled is occupied. The unoccupied reference temperatures, typically selected by the owner of the premises, is selected when the controlled area is unoccupied. The micro-controller monitors the temperature sensor, the occupancy sensor, and mechanical switches and determines which reference temperature applies and controls the heating and cooling unit accordingly.

The fan switch has one of two positions: an ON position and an AUTO position. In the ON position the fan runs continuously. In the AUTO position, the micro-controller turns on the fan and heating or cooling unit when the environment temperature drops below (in the case of heating) or above (in the case of cooling) the reference temperature setting.

The system switch is a three position switch monitored by the micro-controller to determine if the occupant has selected the heating operation, the cooling operation, or has turned the thermostat unit off. If the occupant has selected the COOL switch position, the micro-controller turns on or off the power control switch to control the cooling operation for the controlled environment. Similarly, if the occupant has selected the HEAT switch position, the micro-controller turns on or off the power control switch to control the heating operation to the controlled environment. If the occupant has selected the OFF switch position, the controller does not turn on the heating or cooling unit but continues to monitor and display the current temperature. The controller provides power to the fan, however, if the fan switch is placed in the ON position.

The micro-controller determines the heating and cooling operational cycles by comparing the current environmental temperature measurement from the monitored temperature sensor to the applicable reference temperature, in the case of an occupied room to the reference temperature selected by the occupant or in the case of an unoccupied room to the default settings selected by the owner.

The key switch has two positions: a counter-clockwise position, the normal operating position for the switch, and a clockwise position. In the counter-clockwise position, the occupied reference temperature settings may be adjusted using the programming switch, as will be described below. A key is needed to move the switch from the counter-clockwise position to the clockwise position, where the unoccupied reference temperatures and a time delay can be programmed into the memory device. The reference temperatures for unoccupied operation can only be programmed when the key is inserted into the key switch and the key switch is in the clockwise position.

The programming switch is a three position switch: a neutral center position, an INC (increase) position, and a DEC (decrease) position. To set the unoccupied reference temperature, the system switch is moved to indicate whether the cooling or heating temperature is being adjusted and then the programming switch is held in either the INC or DEC position to either increase or decrease the temperature. To set the unoccupied reference temperature, the key switch is rotated by the key to the clockwise position and then the system switch is moved to indicate whether the cooling or heating temperature is being adjusted. Once the system is designated, the programming switch is held in either the INC or DEC position to either increase or decrease the temperature. To set a time delay, the system switch is moved to the OFF position and the programming switch is moved to either the INC or DEC position to increase or decrease the time delay.

The display devices are four digit liquid-crystal displays. The left two digits of the display device indicate the set point temperature currently referenced by the micro-controller. The right two liquid-crystal display digits indicate the current temperature of the environment area controlled by the dual set point thermostatic controller assembly. However, when the key switch is rotated to the clockwise position and the unoccupied reference temperature is being adjusted, the left two digits of the liquid-crystal display device indicates the unoccupied reference temperature as it is increased or decreased and the right two digits of the display device will show two dashes (- -) confirming that the unoccupied reference temperature is addressed rather than the occupied reference temperature.

The occupancy sensing unit includes an infrared sensor, which detects the heat emanating from a person's body. During periods of vacancy, the occupancy sensor will not send a trigger signal to the micro-controller. Without the triggering signal the micro-controller maintains the environmental conditions of the controlled area by use of the programmed set point reference temperatures intended for unoccupied conditions. During periods of occupancy, the micro-controller receives triggering signals from the occupancy sensor and maintains the environmental conditions of the controlled area by use of the programmed set point reference temperatures intended for occupied conditions.

In another aspect of the invention, remote sensing units are provided. The remote sensing units communicate with the thermostat control unit using conventional telephone wires. Conventional telephone jacks are mounted to the remote sensing unit and to the control unit so that the remote sensing unit can transmit the triggering signal to the micro-controller.

BRIEF DESCRIPTION OF THE DRAWINGS

Figures of a preferred embodiment of the invention are annexed hereto so that the invention may be better and more fully understood, in which.

Other objects and advantages of the invention will become apparent upon reading the following detailed description and upon reference to the drawings, in which like reference characters are used throughout the drawings to designate like parts.

DESCRIPTION OF THE PREFERRED EMBODIMENTS

Figure 1:
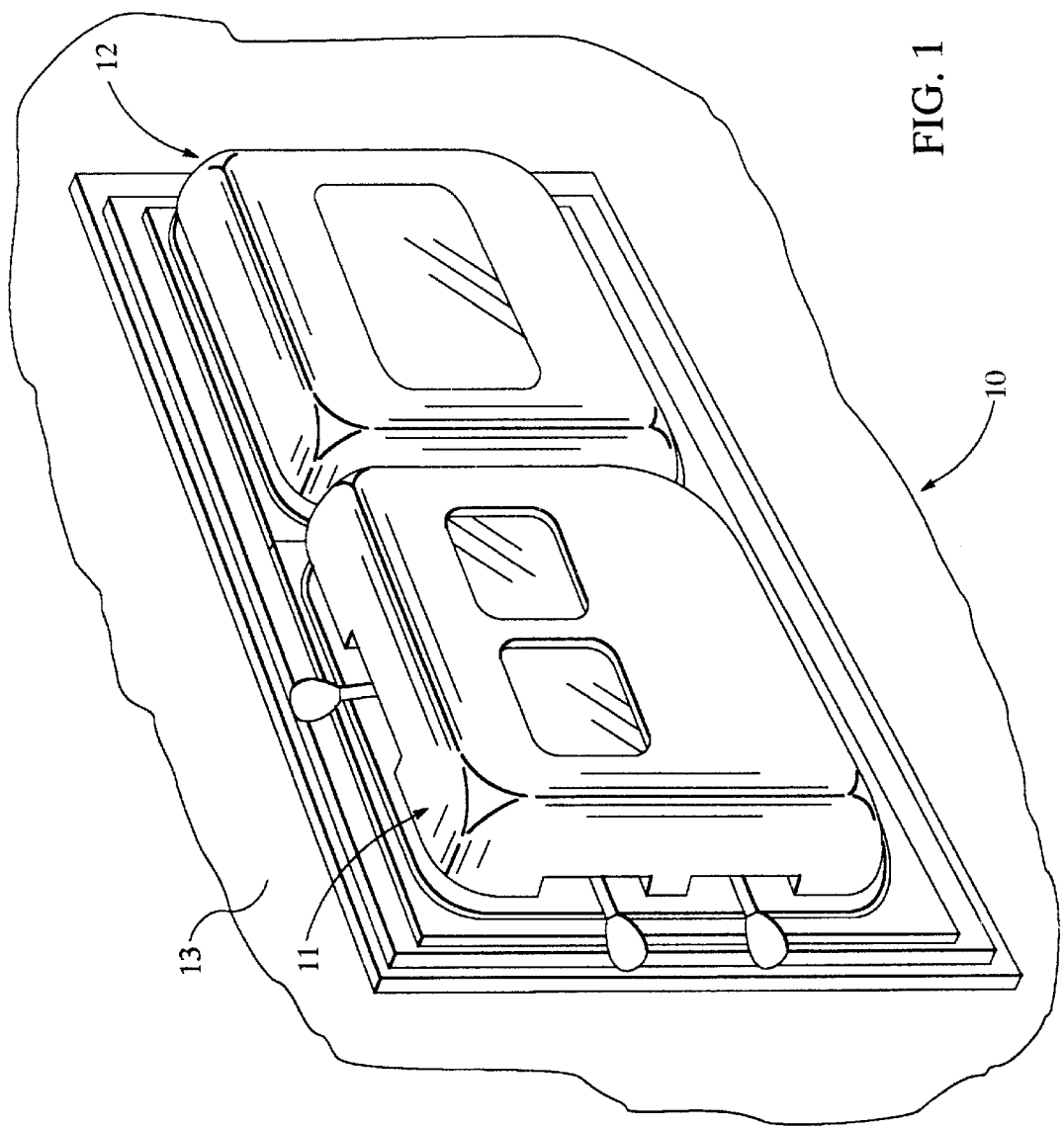
FIG. 1 is a perspective view of the dual set point thermostatic controller assembly of the present invention.

Referring to FIG. 1, the dual set-point thermostatic controller assembly generally designated by the numeral 10 comprises a thermostat control unit 11 and an occupancy sensing unit 12. In a first preferred embodiment of the thermostatic controller assembly, thermostat control unit 11 is mounted adjacent the sensor unit 12 on a mounting surface 13 in a room.

Figure 10A:
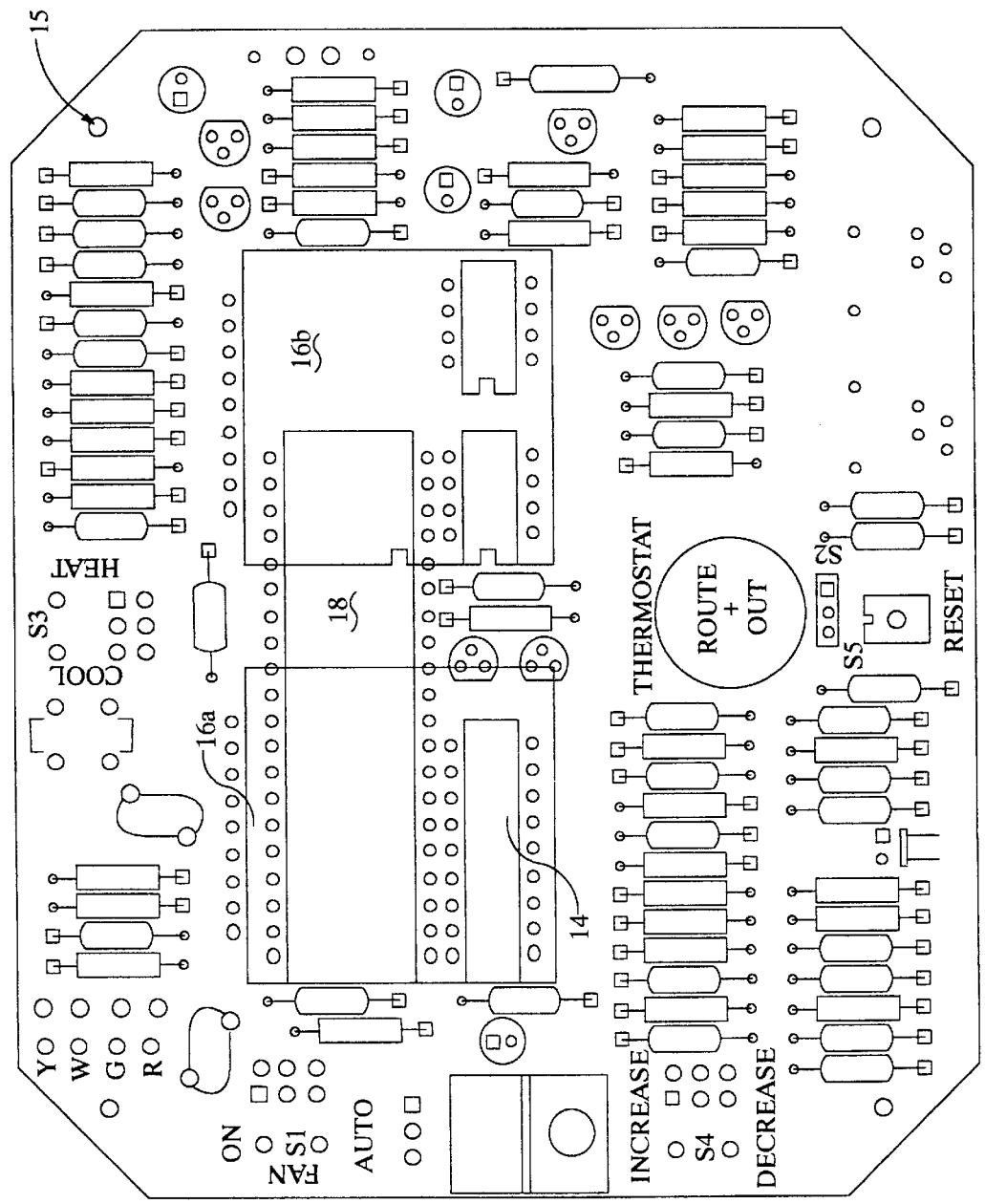
FIG. 10a is a plan view of the control unit circuit board.
Figure 10B:
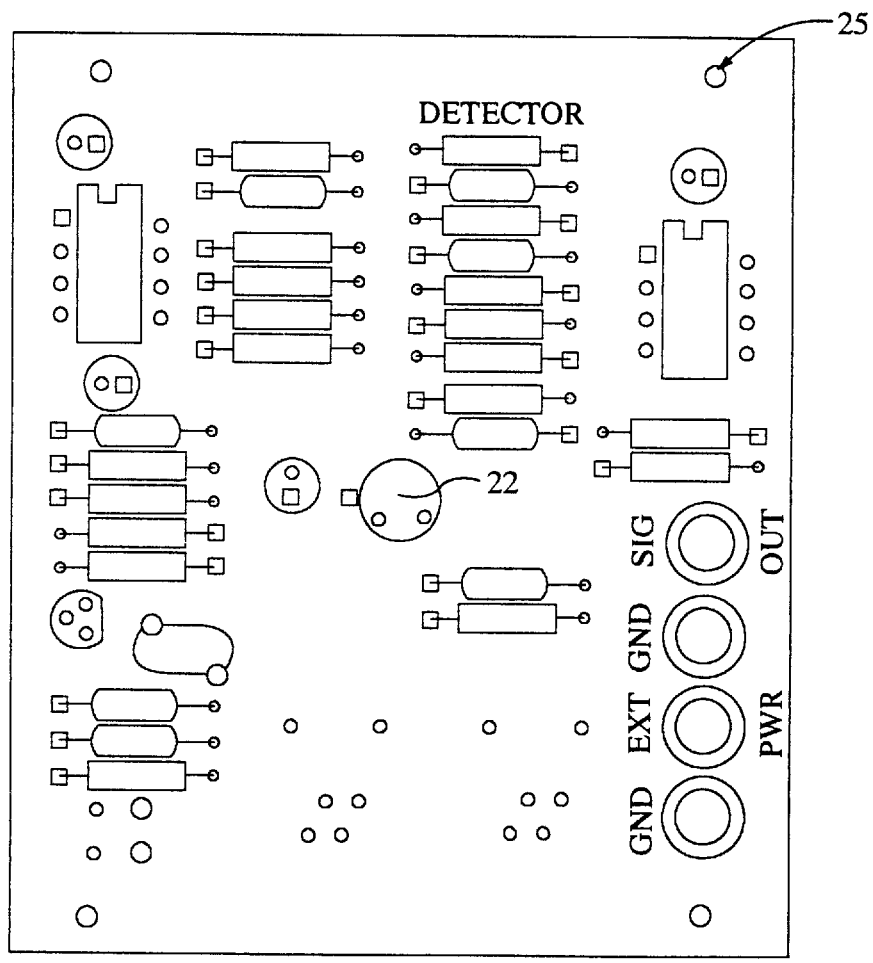
FIG. 10b is a plan view of the sensing unit circuit board.
Figure 13A:
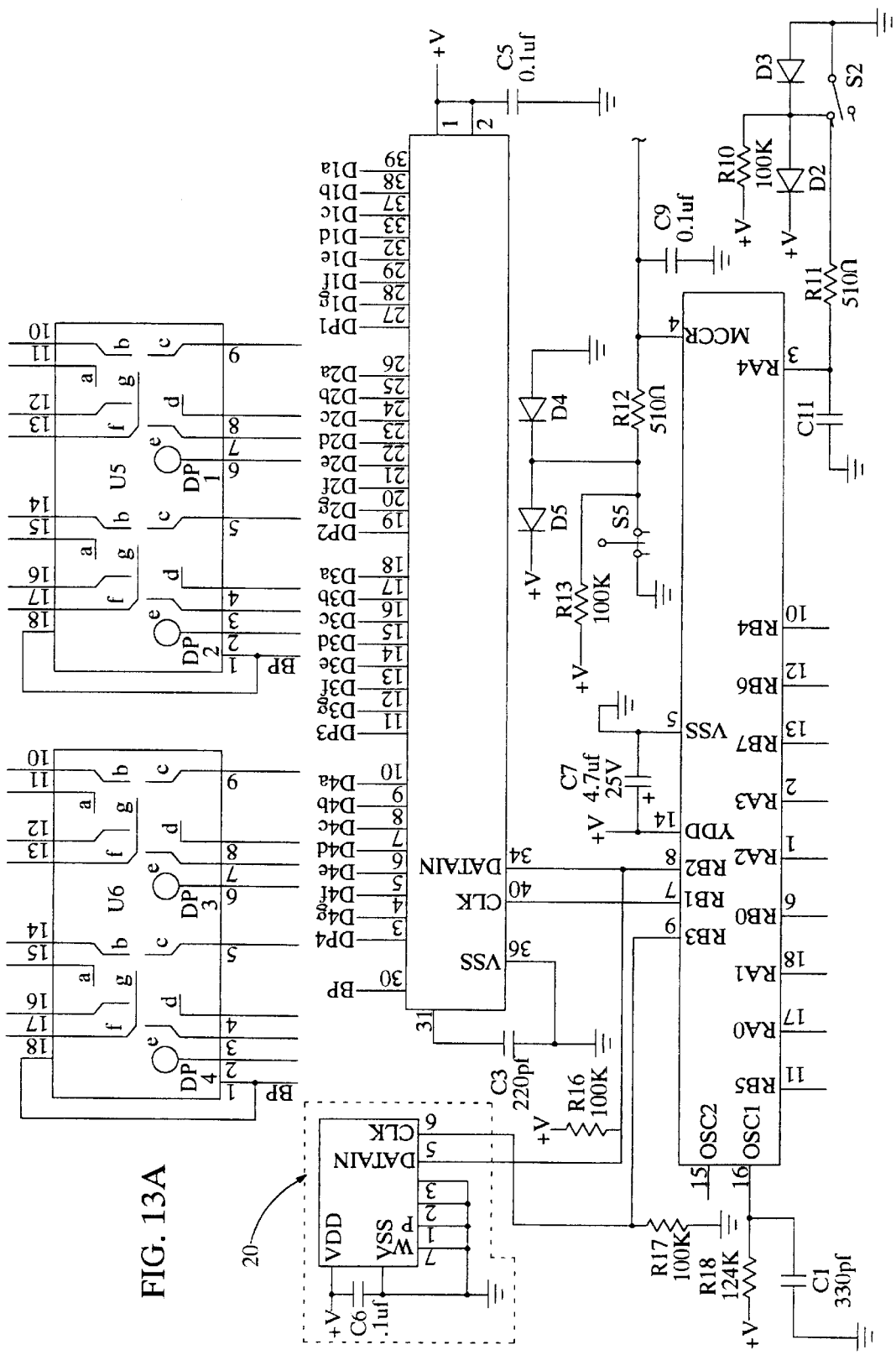
FIG. 13 is an electrical schematic of the micro-controller, segment driver and liquid-crystal display portion of the controller unit.
Figure 13B:
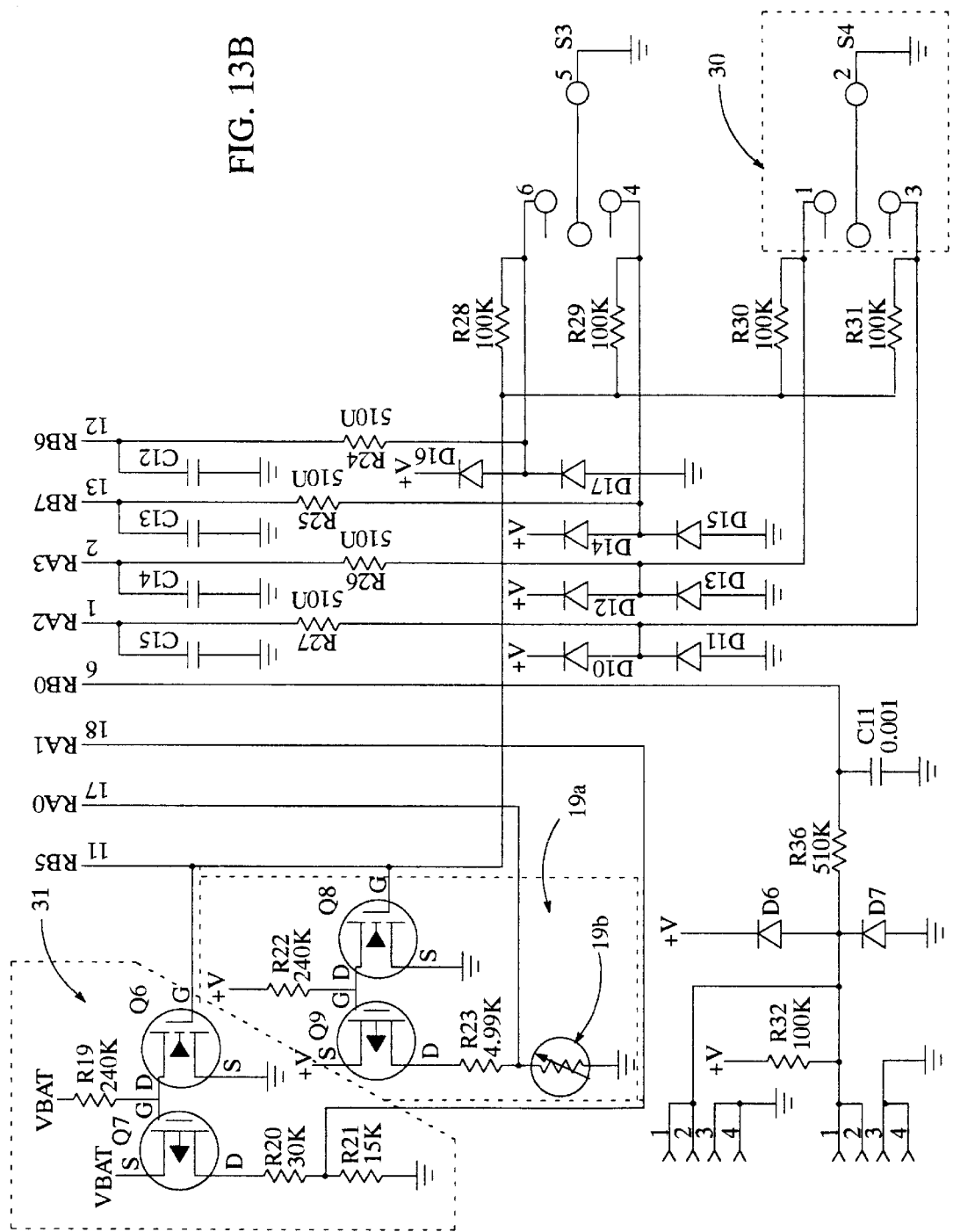
Figure 13C:
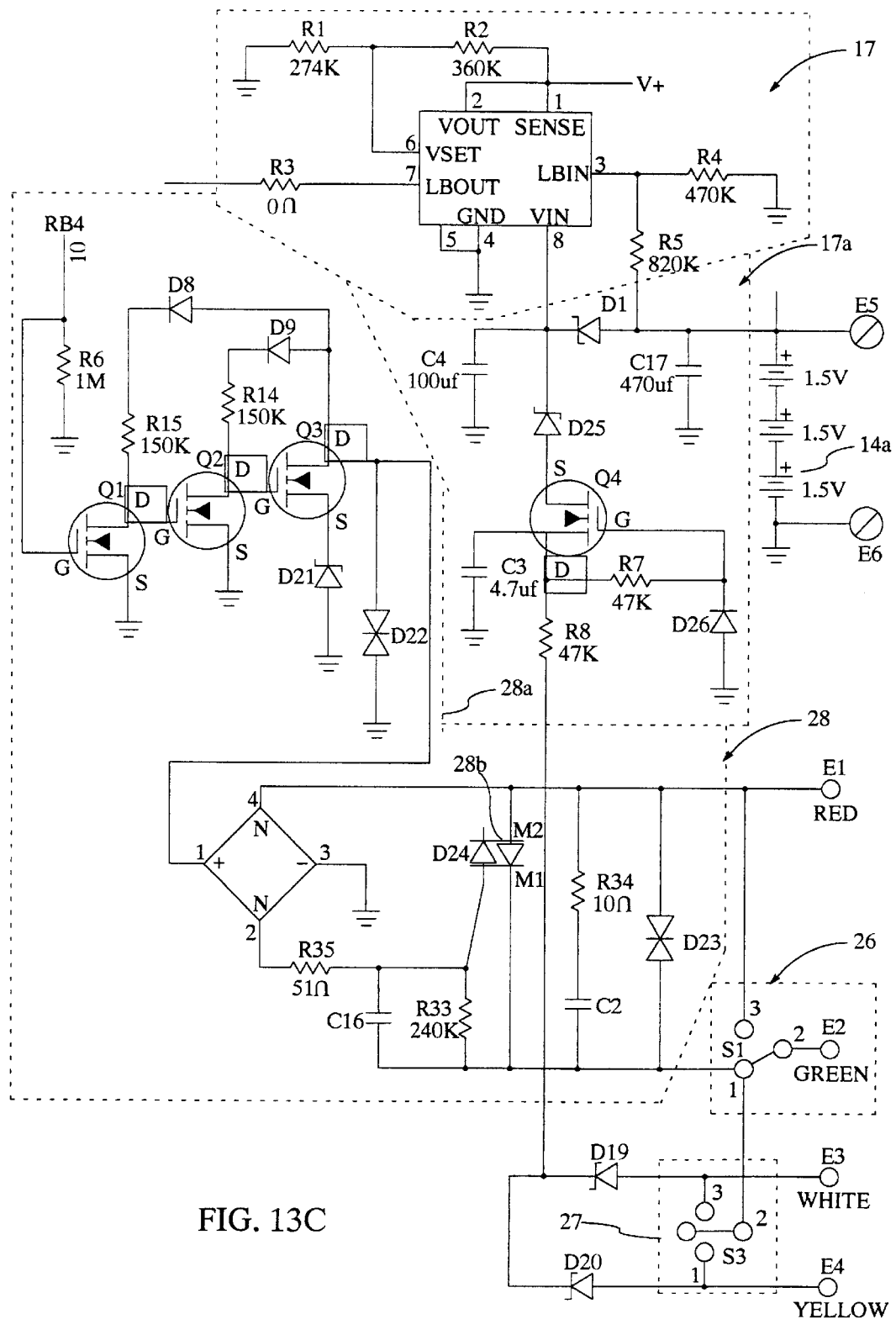
Figure 14:
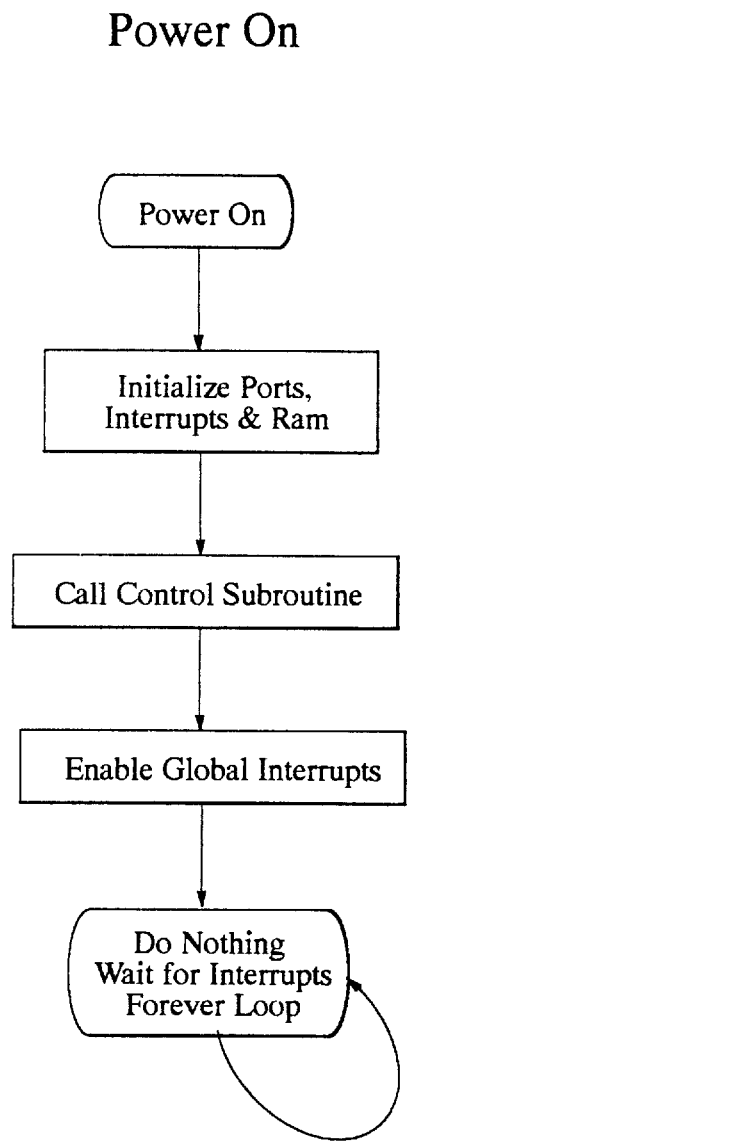
FIG. 14 is a flow diagram of the power on sequence of the computer program.
Figure 15:
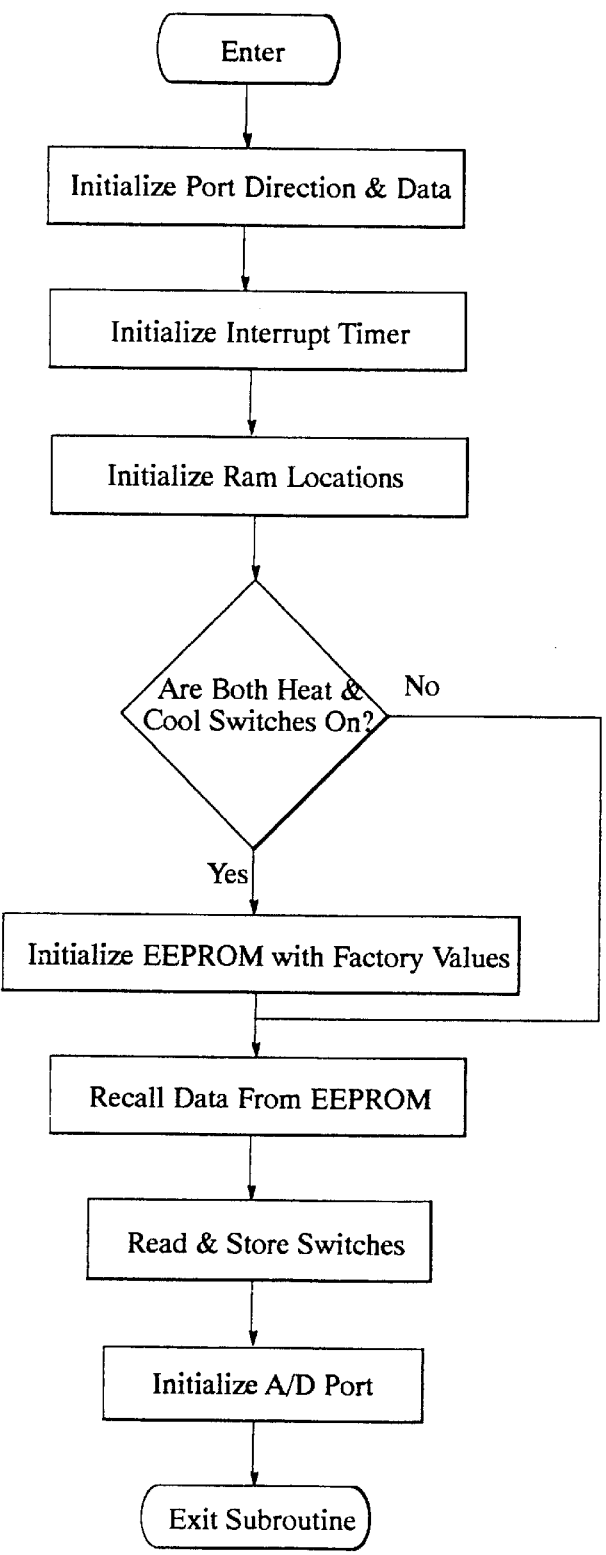
FIG. 15 is a flow diagram of the initialization sequence of the computer program.
Figure 16:
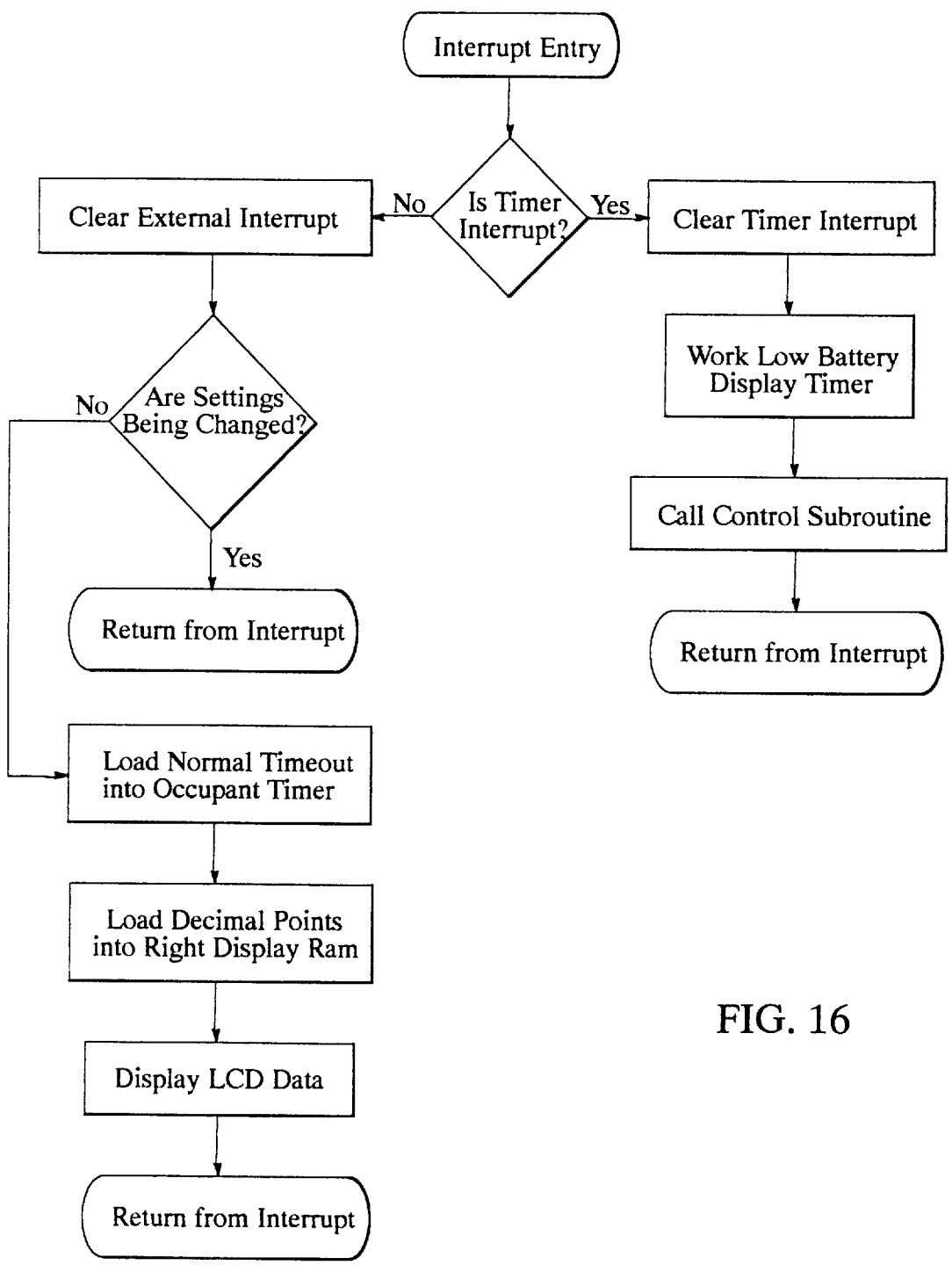
FIG. 16 is a flow diagram of the interrupts sequence of the computer program.
Figure 17:
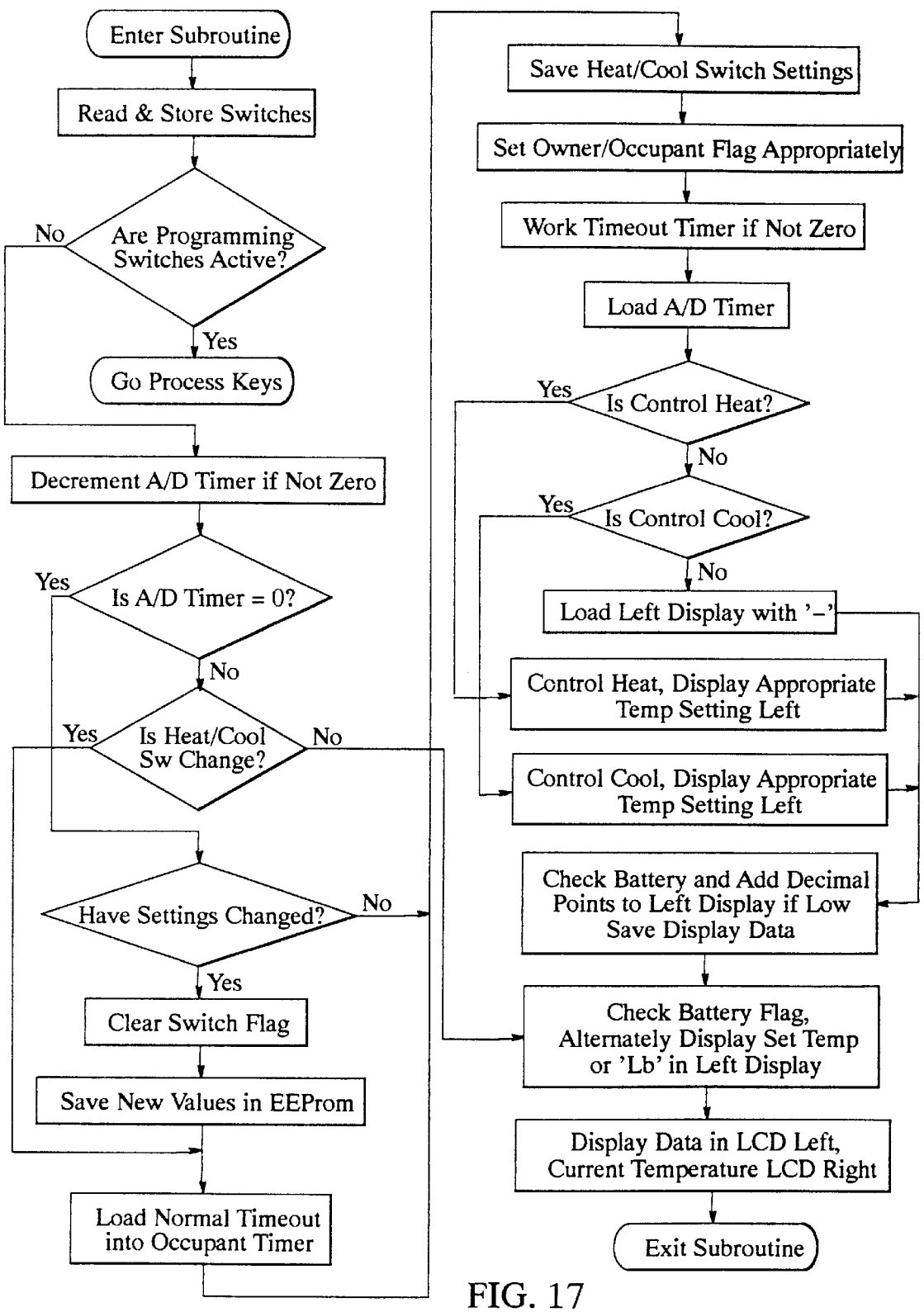
FIG. 17 is a flow diagram of the control sequence of the computer program.
Figure 18:
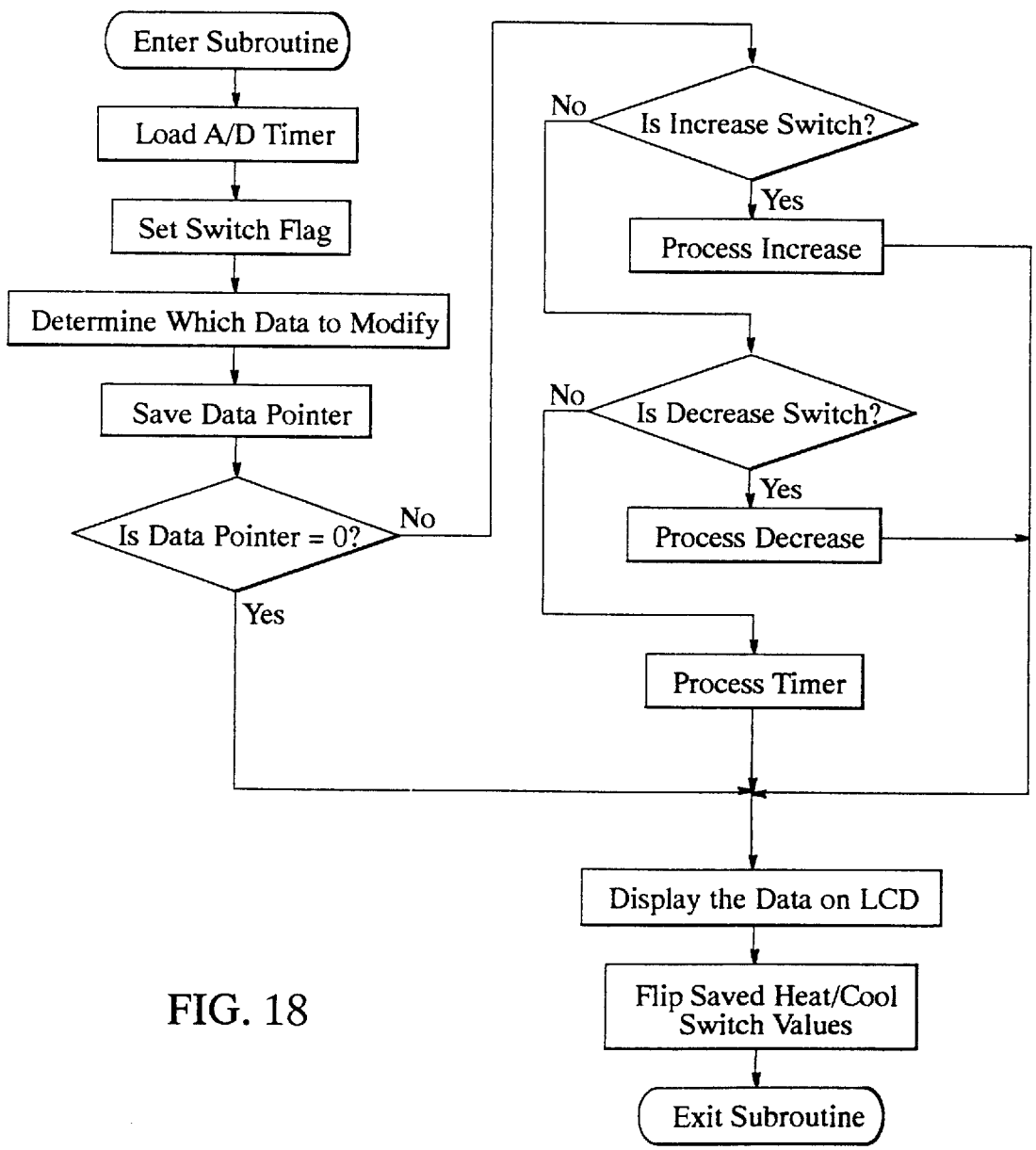
FIG. 18 is a flow diagram of the process keys sequence of the computer program.
Figure 19:
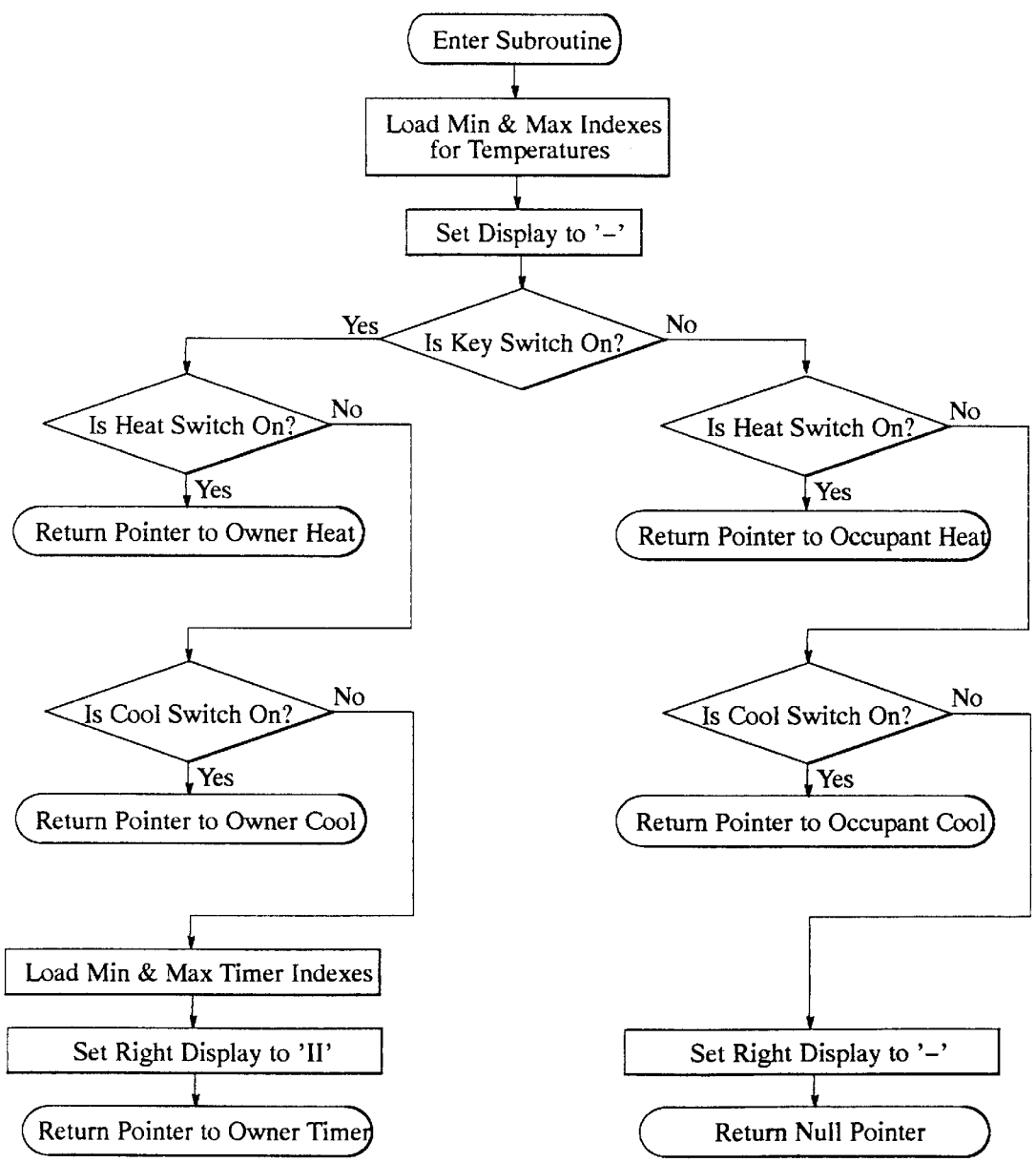
FIG. 19 is a flow diagram of the determination of which data to modify sequence of the computer program.
Figure 20:
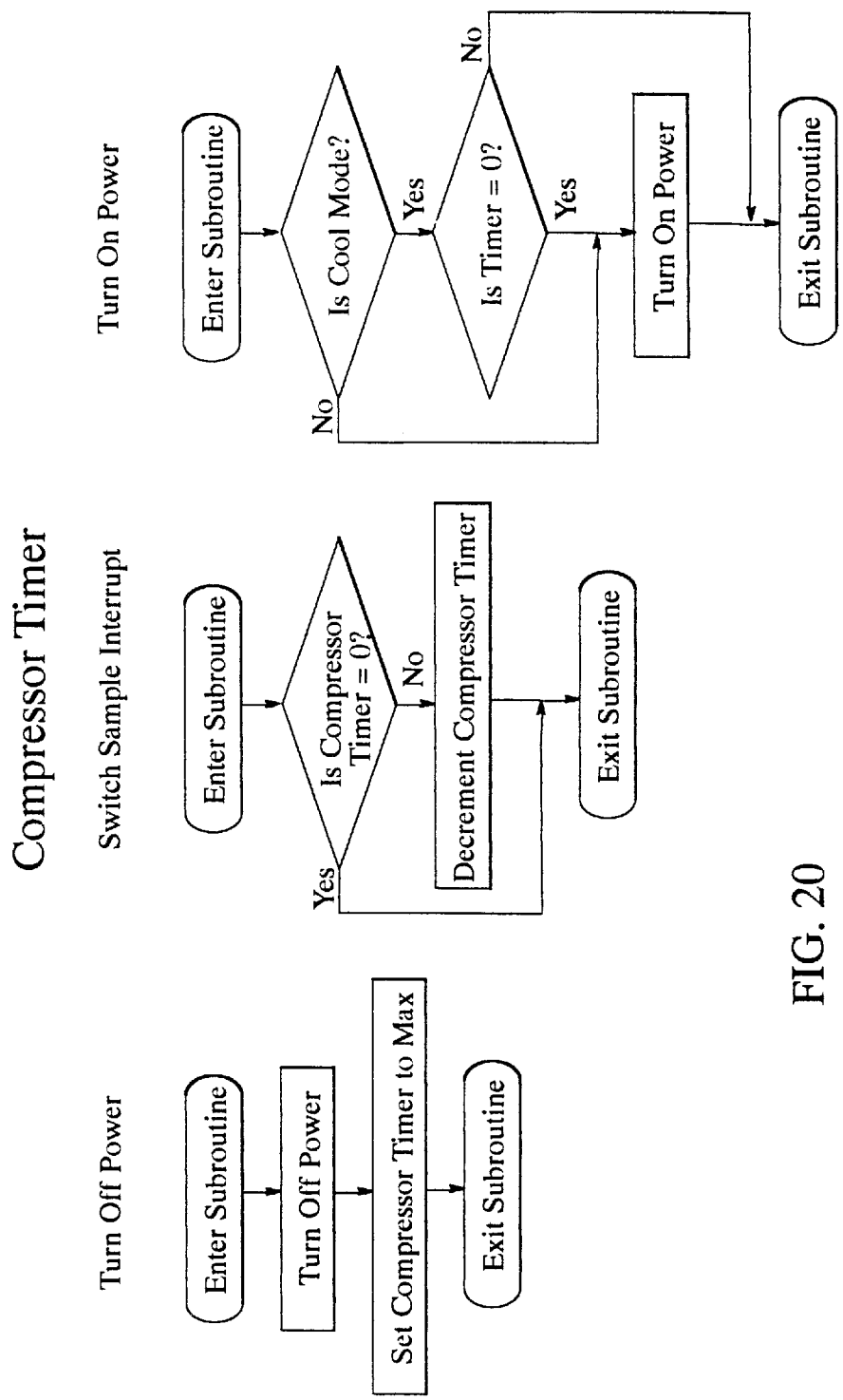
FIG. 20 is a flow diagram of the compressor timer sequence of the computer program.

As best shown in FIG. 10 and 13, control unit 11 comprises a micro-controller chip 14 and power supply 14a that are mounted on a circuit board 15 for actuating relay switches (not shown), which in turn actuate a heating and cooling system (not shown) and a set of display devices 16a and 16b. The display devices display the temperature of the room and desired reference temperature and are connected to the micro-controller through a segment display driver 18. Micro-controller 14 receives power from power supply 14a through a power regulator circuit 17 and input from several internal and external sources: a temperature sensor 19, the occupancy sensor 12, a memory device 20, and a plurality of mechanical switches.

Regulator circuit 17 maintains the level of the voltage supply to the micro-controller chip 14 at approximately 3-volts. Regulator circuit 17 is powered by the three 1.5-volt batteries and a standard 60 HZ power supply (not shown). Regulator circuit 17 includes a 60 HZ feed circuit 17a that connects to the 60 Hz supply through system switch 27. System switch 27 and fan switch 26 are both powered by the 60 Hz power supply. By including feed circuit 17a, the micro-controller 14 generally does not draw power from the batteries. As a result, the batteries have a longer life and are only drained when there is a general power failure in the dwelling's main electrical supply.

Temperature sensor 19 provides information about the environment to be controlled and comprises temperature circuit 19a with a thermistor 19b. Thermistors are temperature-sensitive bilateral resistors that exhibit a negative temperature coefficient. In other words, the device exhibits a high resistance at low temperatures and a low resistance at high temperatures. Depending on the temperature of the environment, the thermistor's resistance values will vary and cause the temperature circuit 19a to generate a high or low input to the micro-controller chip 14.

Figure 12:
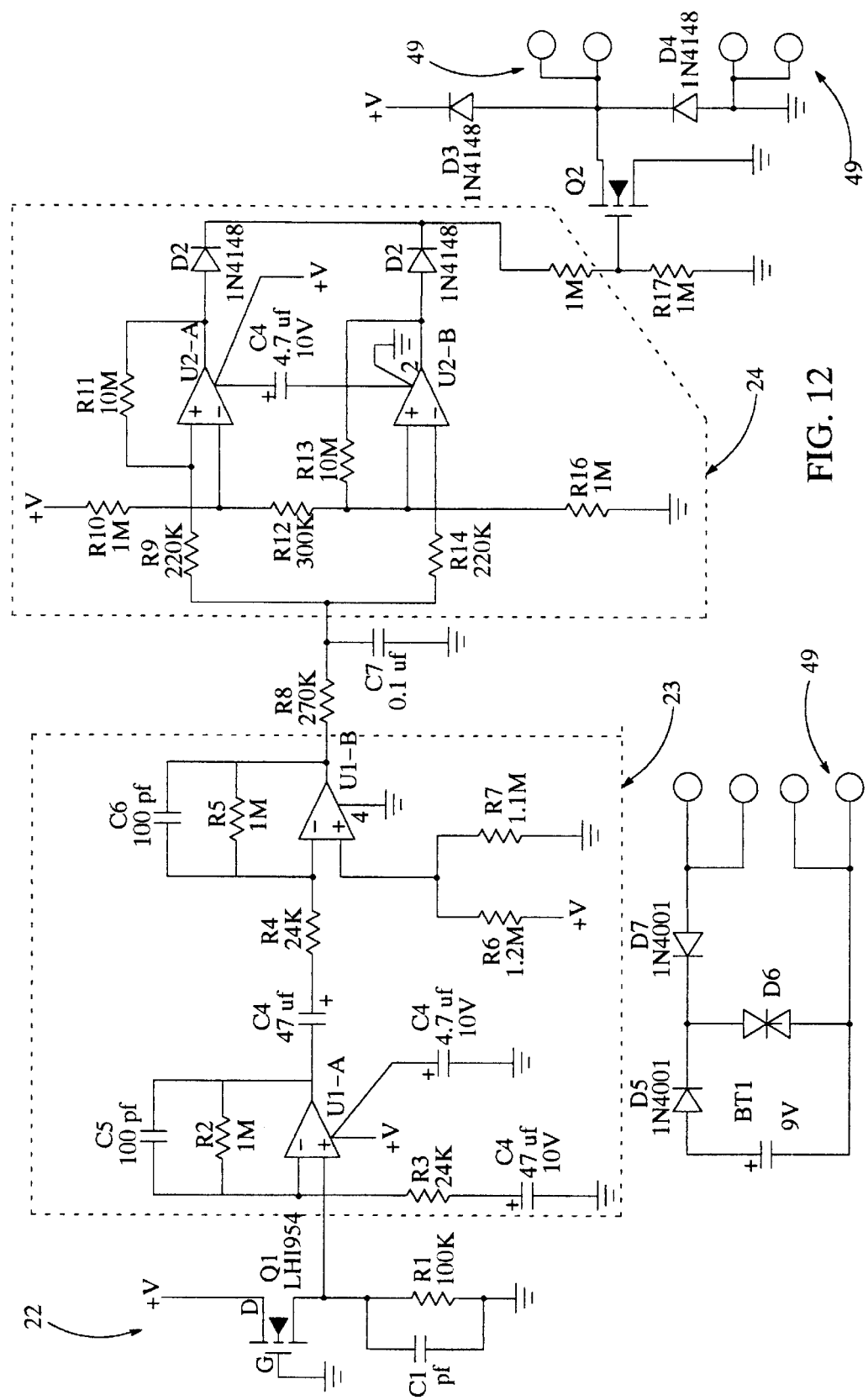
FIG. 12 is an electrical schematic of the occupancy sensing unit.

Occupancy sensor unit 12 provides information about the occupancy of the room and includes an infrared sensor 22, a dual operational-amplifier circuit 23, and a dual-comparator circuit 24, all of which are mounted on a circuit board 25. As best shown in FIG. 12, infrared sensor 22 comprises a pyrosensor transistor which sends a triggering signal when heat is detected to the micro-controller chip 14, causing the controller chip 14 to use the occupied reference temperatures. When the infrared sensor 22 does not detect a heat source, the transistor does not send a triggering signal to the micro-controller 14. The micro-controller chip 14 uses the default reference temperatures—the unoccupied reference temperatures set by the owner.

Memory device 20 stores information about the desired reference temperatures for an occupied room and unoccupied room and provides the information to the micro-controller chip 14.

Generally, there are four reference temperatures: an unoccupied-heating reference temperature, an unoccupied-cooling reference temperature, an occupied-heating reference temperature, and an occupied-cooling reference temperature. Default values are generally provided for all four reference temperatures and stored on the memory device at the manufacturers. As shown in FIG. 13, an EEPROM memory device is used; however, any industry standard memory device can be substituted, as would be understood by a person having ordinary skill in the art. Micro-controller chip 14 operates to select one of the four reference temperatures stored in the memory device 20 by monitoring the occupancy sensor 22, a fan switch 26, and a system switch 27.

Fan switch 26 has one of two positions: an ON and an AUTO position. In the ON position the fan (not shown) runs continuously. In the AUTO position, the micro-controller 14 turns on the fan and heating or cooling unit when the environment temperature drops below (in the case of heating) the heating reference temperature setting or above (in the case of cooling) the cooling reference temperature setting.

System switch 27 is a three-position switch, with a COOL position, a HEAT position, and an OFF position. If the occupant has selected the COOL switch position, micro-controller 14 will compare the cooling reference temperature to the temperature detected by the thermal sensor 19. If the temperature detected by the thermal sensor 19 is higher than the cooling reference temperature, the micro-controller will actuate the cooling unit by turning on a power switch 28, the position of the system switch directs the current from the power switch to the appropriate heating or cooling unit through lead wire 27a, shown in FIG. 2. Power switch 28 comprises a power switching circuit 28a and a triac 28b which connect to the 60 Hz power supply. Triacs are bidirectional thrysistors that switch from a blocking state to a conducting state for an applied voltage.

Figure 2:
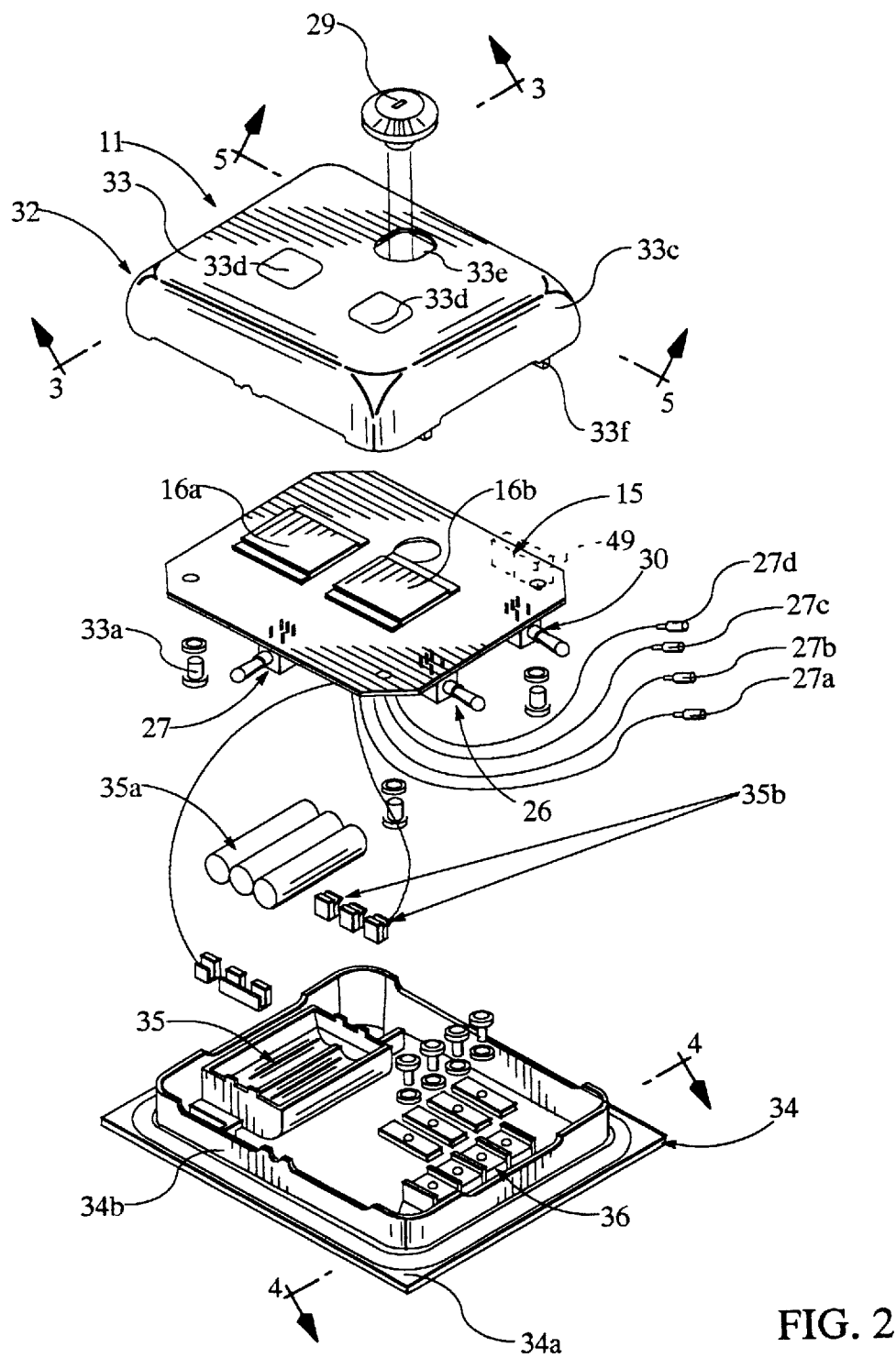
FIG. 2 is an exploded perspective view of the thermostatic controller unit of the present invention.
Figure 3:
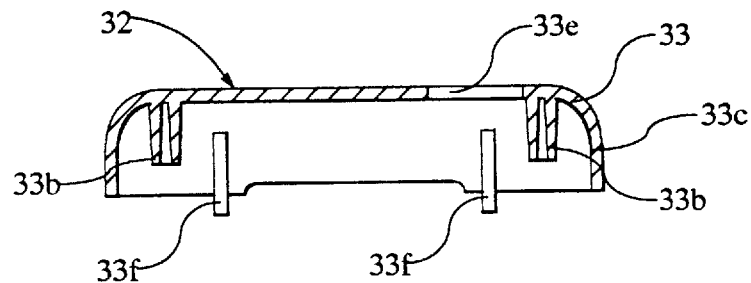
FIG. 3 is a cross-sectional view taken along line 3—3 of FIG. 2.
Figure 4:
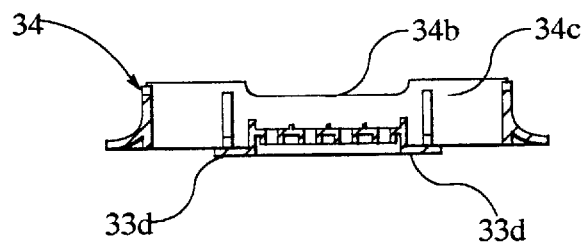
FIG. 4 is a cross-sectional view taken along line 4—4 of FIG. 2.
Figure 5:
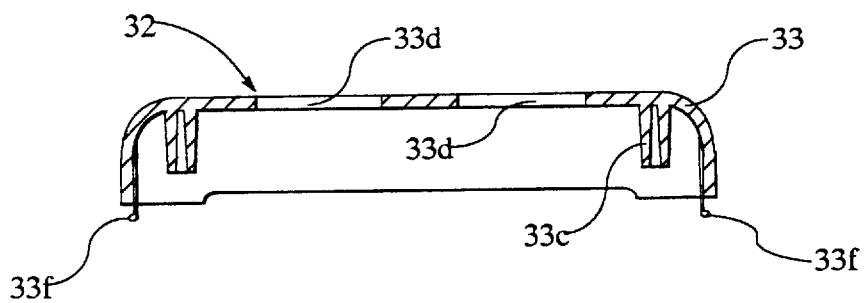
FIG. 5 is a cross-sectional view taken along line 5—5 of FIG. 2.

If the occupant has selected the HEAT switch position, micro-controller 14 will compare the heating reference temperature to the temperature detected by the thermal sensor 19. If the temperature detected by the thermal sensor 19 is lower than the heating reference temperature, the micro-controller 14 will actuate the heating unit by turning on the power switch which in turn sends current through lead wire 27b, as shown in FIG. 2, to the relay switch (not shown) for the heating unit. As described above, the micro-controller chip 14 chooses between the occupied reference temperatures and the unoccupied reference temperatures based on the presence of the triggering signal generated by occupancy sensing unit 12.

If the occupant has selected the OFF switch position for system switch 27, the controller 14 will not turn on the heating or cooling unit but will continue to monitor and display the current temperature on the display devices 16a and 16b. The controller 14 will, however, provide power to the fan through the power switch 28 and lead wire 27c, as shown in FIG. 2, which in turn sends power to the fan relay fan relay switch (not shown), if switch 26 is placed in the ON position.

A key switch 29 is provided which has two positions: a counter-clockwise position and a clockwise position. In the counter-clockwise position, the occupied reference temperature settings may be adjusted. In the clockwise position, the unoccupied reference temperature settings may be adjusted. However, a key (not shown) is needed to move key switch 29 from the counter-clockwise position, which is the normal operating position for the switch, to the clock-wise position, where the unoccupied reference temperatures and a time delay can be programmed into the memory device 20. The reference temperatures for unoccupied operation can only be programmed when the key switch 29 is in the clockwise position.

In order to adjust the occupied reference temperature settings and unoccupied reference temperature settings, a programming switch 30 is provided. Programming switch 30 is a three position switch that is spring-loaded to normally remain in a neutral center position. The other two positions are an INC position and a DEC position. In the INC position, programming switch 30 increments the reference temperature at a rate of one count per second. Similarly, when programming switch 30 is held in the DEC position, the switch decrements the reference temperature at a rate of one count per second. As there are four reference temperatures, the micro-controller monitors the position of key switch 29 and the position of the system switch 27 to determine which of the four reference temperatures is to be adjusted.

To set a time delay, key switch 29 is rotated by the key to the clockwise position and system switch 27 is moved to the OFF position. As in the case of the reference temperatures, a default time delay can be pre-programmed into the memory at the manufacturing facilities. To adjust the default time delay value, programming switch 30 is moved to either the INC or DEC position. The left two digits of the display device will display the factory set time delay or the previously programmed time delay for three seconds and then will increase or decrease the time until the programming switch is returned to its center position. Once the desired unoccupied reference temperatures and time delay are programmed into the memory device, the key is then rotated back to the counter-clockwise position and removed.

The display devices 16a and 16b are four digit liquid-crystal displays. The left two digits of the display device 16a indicate the reference set point temperature currently referenced by the micro-controller. The right two liquid-crystal display digits 16b indicate the current temperature of the environment area controlled by the dual set-point thermostatic controller assembly. During programming of the unoccupied reference temperatures, the micro-controller chip 14 is programmed to drive (through the segment driver 18) the left two digits of the liquid-crystal display device 16a to display the programmed temperature and the right two digits of liquid-crystal display device 16b to display two dashed (--). Similarly, during programming of the time delay, the micro-controller chip 14 is programmed drive the left two digits to display the factory set time delay or the previously programmed time delay for three seconds and then to increase or decrease the time until the programming switch is returned to its center position. During this sequence the right two digits will display four vertical lines (||||).

When the micro-controller 14 detects that the assembly's internal battery is low, the micro-controller chip 14 drives the left two digits to indicate a LOW BATTERY signal (Lb). In order to detect the level of the battery, a battery monitor circuit 31 is provided. Referring to FIG. 13, battery monitor circuit 31 is a simple circuit having a pair of MOSFETs which connect to the battery and are driven by the battery when the battery is charged, thus allowing current to pass through the circuit and back to the micro-controller chip 14. When the battery's voltage drops below a specified level, the MOSFETS do not send a current to the controller chip and in response, the micro-controller chip drives reacts to this by driving the left two digits to indicate a LOW BATTERY signal (Lb). Preferably, this operation occurs approximately 60 days prior to the battery terminal voltage actually falling to a level requiring a system shutdown condition. If the assembly's battery terminal voltage is allowed to fall to a shutdown level the battery monitor circuit will trigger the system to discontinue operations.

In order to protect the micro-controller chip 14 and circuit board 15 from the environment, the circuit board 15 is mounted in a housing 32. As best shown in FIG. 2, housing 32 includes a top cover portion 33 and a base 34. Top cover portion 33 is generally rectangular in shape and sized to fit over base 34. Circuit board 15 is mounted to the underside of top cover portion 33 by fasteners 33a which anchor into downwardly projecting bosses 33b. In order to view display devices 16a and 16b and to access key switch 29, cover portion 33 includes apertures 33d and 33e. Apertures 33d are sized to allow an unobstructed view of all four digits of the liquid-crystal display device 16a and 16b. Key switch 29 is mounted in aperture 33e.

In the preferred embodiment, cover portion 33 further includes a downwardly extending lip portion 33c that slides over the base 34 and a set of downwardly extending tabs 33f which extend from the inner wall of lip portion 33c. As best seen in FIGS. 2-5, the base 34 includes a mounting flange 34a for mounting the unit to mounting surface 13 and an upstanding lip portion 34b. Inner wall 34c of upstanding lip portion 34b includes a set of recesses 33d which provide a slot into which downwardly projecting tabs 33f of top cover portion 33 snap, thus releasably securing top cover portion 33 to base 34. Furthermore, base 34 includes a battery housing 35 and battery contacts 35b for supporting and holding three AAA-batteries 35a, which power the control unit 11, and a set of terminal blocks 36 for connecting the control unit 11 to the external inputs and outputs. However, it can be appreciated that the battery housing 35 can be modified to support other standard batteries provided that the total voltage supply is approximately 4.5 volts.

Figure 6:
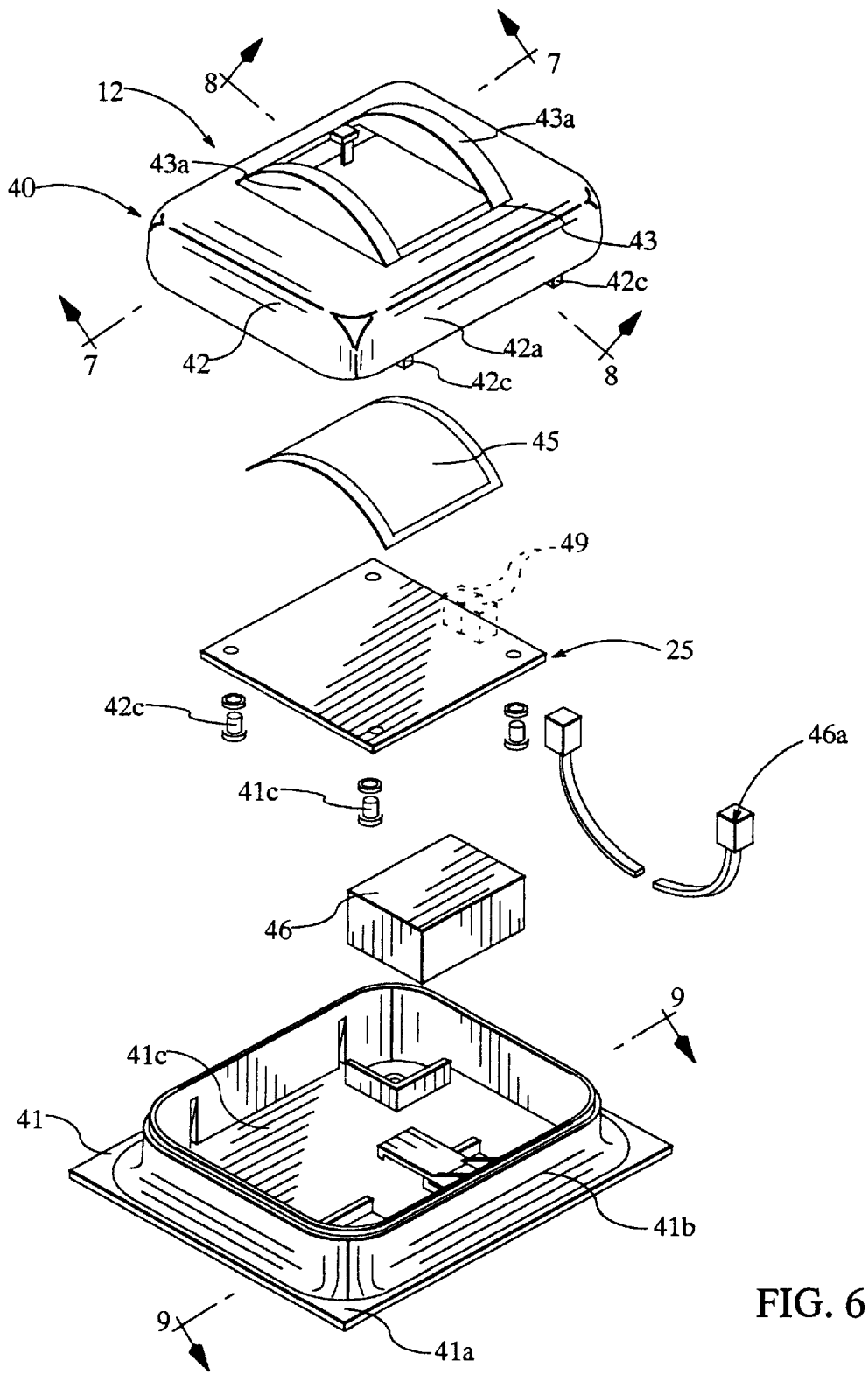
FIG. 6 is an exploded perspective view of the sensing unit.
Figure 7:
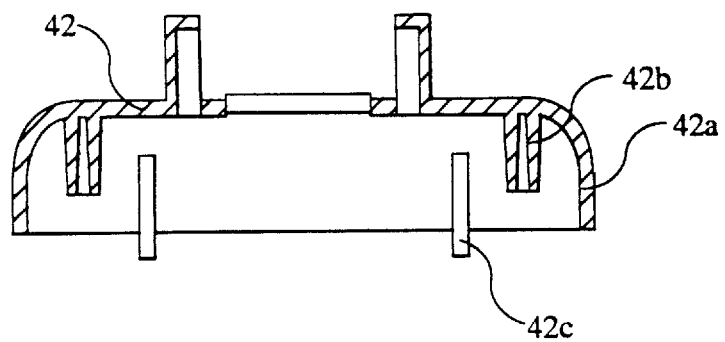
FIG. 7 is a cross-sectional view taken along line 7—7 of FIG. 6.
Figure 8:
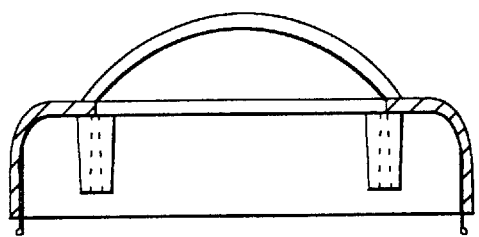
FIG. 8 is a cross-sectional view taken along line 8—8 of FIG. 6.
Figure 9:
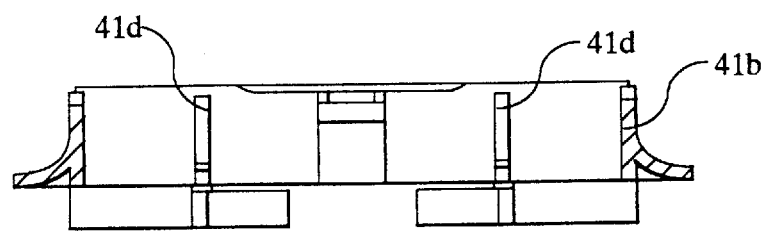
FIG. 9 is a cross-sectional view taken along line 9—9 of FIG. 6.

Sensing unit 12 similarly includes a generally rectangular shaped housing 40. As best shown in FIG. 6, housing 40 comprises a base 41 and a cover 42. Base 41 generally includes a mounting flange 41a, for mounting sensor unit 12 to mounting surface 13, and an upstanding lip portion 41b, which provides a compartment 41c for storing a battery 46 and battery leads 46a.

Cover 42 includes a downwardly depending lip portion 42a, which slides over upwardly extending lip portion 41b of base 41, and a set of downwardly extending bosses 42b. Sensing unit circuit board 25 is mounted to the underside of cover 42 by a set of fasteners 42c which extend into bosses 42b. Cover 42 is removably secured to base 41 by tabs 42 which extend downwardly from the inner wall of lip portion 42a and engage recesses 41d provided on the inner wall of upwardly depending lip portion 41b of base 41, thus forming a snap-fit connection between the cover portion 42 and base 41. However, it should be appreciated that the top cover portion and base of both housing units can be connected using other conventional methods, as understood by a person having ordinary skill in the art In order for the occupancy sensor to receive infrared signals from an occupant, an window opening 43 is provided in the in the top cover. In order to collect signals over a wide peripheral range, a curved fresnel lens 45 is positioned in the window opening and supported by a set of raised rails 43a, which project outwardly from the top surface of the cover 42.

Opening 43 is positioned to align fresnel lens 45 directly above the infrared sensor 22, as lens 45 operates like a wide angled lens for the infrared sensor 22 and directs and focuses the infrared waves onto the transistor 19a of the occupancy sensor 22. The lens 45 preferably has a horizontal viewing angle of approximately one hundred degrees. The lens vertical viewing angle, however, is significantly smaller and extends from a horizontal plane defined by a lower edge of the lens 45 to a few degrees above the horizontal plane. The vertical viewing angle is limited so that the sensor 22 will generally not detect pets that are roaming around on the floor. Preferably, the sensor unit 12 detects human body heat within a nominal range of twelve to fifteen feet and is mounted approximately three feet above the floor level so human occupants that are lying down on a bed or sofa will still be detected.

Control unit 11 and occupancy sensor unit 12 connect together by conventional telephone lines (not shown) which connect to the circuit boards 15 and 25 by conventional telephone jacks 49. As will herein after be more fully explained, the jacks and telephone line connections permit several sensing units to be connected to the control unit. The separation between the control unit 11 and sensor 12 is, therefore, limited only by the length of telephone line that is on hand.

Figure 11:
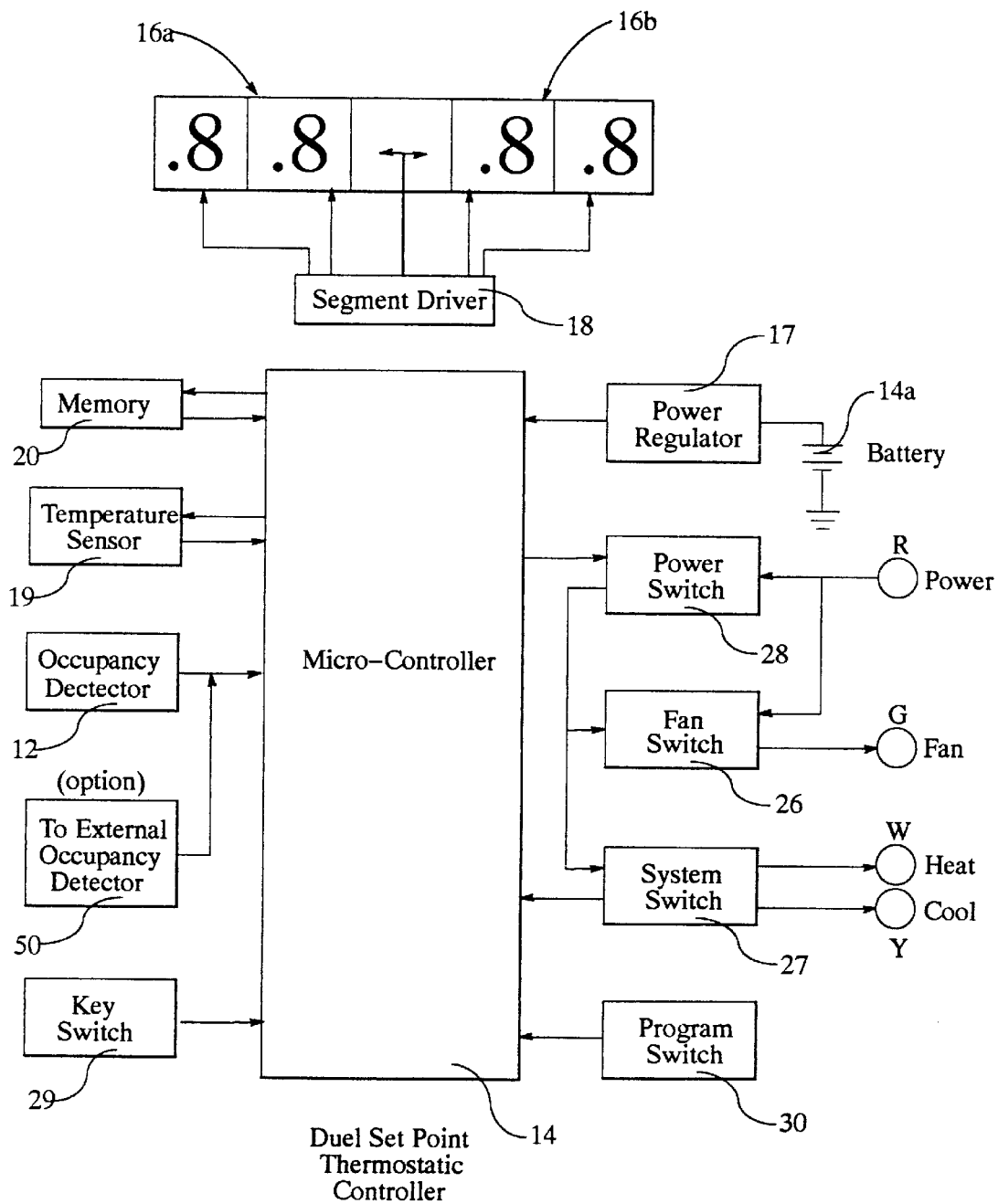
FIG. 11 is a block diagram of the dual set point thermostatic controller assembly.

As illustrated in FIG. 11, an remote sensing unit 50 can be added to thermostatic controller assembly 10. Since there are two jacks 49 mounted on the control unit circuit board 15 and two jacks 49 mounted on the adjacent sensor unit 12, the remote sensing unit 50 can either be connected through a telephone line to the adjacent sensor unit 12 and, therefore, connected in series with the adjacent sensor unit 12 or connected directly to the control unit 11 and, therefore, be connected in parallel with the adjacent sensor unit. If more than one remote sensing unit 50 is needed, the second sensing unit can be serially connected to the first remote sensing unit or connected in parallel to the first remote sensing unit by connecting in series to the adjacent mounted sensor unit. As it can be understood by one having ordinary skill in the art, many other combinations are possible.

Appendix

```
MPASM 01.20 Released           MAIN.ASM   8-10-1995  21:07:15        PAGE  1

LOC  OBJECT CODE   LINE SOURCE TEXT
     VALUE 00001
                   00002         TITLE "Dual Level Thermostat Program June, 1995"
                   00003         LIST C=130, L=55
                   00004
                   00005 ; -----------------------------------------------------------
                   00006
                   00007 ; File Name: MAIN.ASM        Main ASM File
                   00008
                   00009 ; -----------------------------------------------------------
                   00010
                   00011 #include picreg.equ      ; Equates
                   00001 ;        NOLIST
                   00002 ;*********************    PIC16C5X Header    *********************
                   00003 ;
                   00004 ;
01FF               00005 PIC54    equ    0x1FF          ; Define Reset Vectors
01FF               00006 PIC55    equ    0x1FF
03FF               00007 PIC56    equ    0x3FF
07FF               00008 PIC57    equ    0x7FF
0000               00009 PIC71    equ    0x0
                   00010 :
0000               00011 IND0     equ    0x0
0000               00012 INDF     equ    0x0
0001               00013 RTCC     equ    0x1
0002               00014 PC       equ    0x2
0002               00015 PCL      equ    0x2
0003               00016 STATUS   equ    0x3            ; F3 Reg is STATUS Reg.
0004               00017 FSR      equ    0x4
                   00018 ;
0005               00019 PORT_A   equ    0x5
0006               00020 PORT_B   equ    0x6            ; I/O Port Assignments
0007               00021 PORT_C   equ    0x7
                   00022 ;
                   00023 ;
                   00024  if 0
                   00025 ; These are for Simulator only but cause warning * from MPASM
                   00026 ADRES    equ    0x9       ;16C71 Special-purpose registers Bank 0
                   00027 ADCON0   equ    0x8       ;16C71 Special-purpose registers Bank 0
                   00028 ADCON1   equ    0x88      ;16C71 Special-purpose registers Bank 1 *
                   00029 PCLATH   equ    0xA       ;16C71 Special-purpose registers Bank 0
                   00030 INTCON   equ    0xB       ;16C71 Special-purpose registers Bank 0
                   00031 TRISA    equ    0x85      ;16C71 Special-purpose registers Bank 1 *
                   00032 TRISB    equ    0x86      ;16C71 Special-purpose registers Bank 1 *
                   00033 OPTION_R equ    0x81      ;16C71 Special-purpose registers Bank 1 *
                   00034
                   00035   else
                   00036
                   00037 ; These are for normal use and don't cause warnings *
0009               00038 ADRES    equ    0x9       ;16C71 Special-purpose registers Bank 0
```

```
MPASM 01.20 Released              MAIN.ASM   8-10-1995  21:07:15      PAGE   2
Dual Level Thermostat Program June, 1995

LOC  OBJECT CODE     LINE SOURCE TEXT
VALUE 0008              00039 ADCON0    equ    0x8      ;16C71 Special-purpose registers Bank 0
0008              00040 ADCON1    equ    0x8      ;16C71 Special-purpose registers Bank 1 *
000A              00041 PCLATH    equ    0xA      ;16C71 Special-purpose registers Bank 0
000B              00042 INTCON    equ    0xB      ;16C71 Special-purpose registers Bank 0
0005              00043 TRISA     equ    0x5      ;16C71 Special-purpose registers Bank 1 *
0006              00044 TRISB     equ    0x6      ;16C71 Special-purpose registers Bank 1 *
0001              00045 OPTION_R  equ    0x1      ;16C71 Special-purpose registers Bank 1 *
                  00046   endif
                  00047 ;
                  00048 ;
                  00049 ;**********************************************************
                  00050 ;
                  00051 ;                              ; STATUS REG. Bits
0000              00052 CARRY     equ    0x0         ; Carry Bit is Bit.0 of F3
0000              00053 C         equ    0x0
0001              00054 DCARRY    equ    0x1
0001              00055 DC        equ    0x1
0002              00056 Z_bit     equ    0x2         ; Bit 2 of F3 is Zero Bit
0002              00057 Z         equ    0x2
0003              00058 P_DOWN    equ    0x3
0003              00059 PD        equ    0x3
0004              00060 T_OUT     equ    0x4
0004              00061 TO        equ    0x4
0005              00062 PA0       equ    0x5      ;16C5X Status bits
0006              00063 PA1       equ    0x6      ;16C5X Status bits
0007              00064 PA2       equ    0x7      ;16C5X Status bits
                  00065 ;
                  00066 ;
0005              00067 RP0       equ    0x5      ;16C71 Status bits
0006              00068 RP1       equ    0x6      ;16C71 Status bits
0007              00069 IRP       equ    0x7      ;16C71 Status bits
0007              00070 GIE       equ    0x7      ;16C71 INTCON register bits
0006              00071 ADIE      equ    0x6      ;16C71 INTCON register bits
0005              00072 T0IE      equ    0x5      ;16C71 INTCON register bits
0004              00073 INTE      equ    0x4      ;16C71 INTCON register bits
0003              00074 RBIE      equ    0x3      ;16C71 INTCON register bits
0002              00075 T0IF      equ    0x2      ;16C71 INTCON register bits
0001              00076 INTF      equ    0x1      ;16C71 INTCON register bits
0000              00077 RBIF      equ    0x0      ;16C71 INTCON register bits
0007              00078 ADCS1     equ    0x7      ;16C71 ADCN0 register bits
0006              00079 ADCS0     equ    0x6      ;16C71 ADCN0 register bits
0004              00080 CHS1      equ    0x4      ;16C71 ADCN0 register bits
0003              00081 CHS0      equ    0x3      ;16C71 ADCN0 register bits
0002              00082 GO        equ    0x2      ;16C71 ADCN0 register bits
0002              00083 DONE      equ    0x2      ;16C71 ADCN0 register bits
0001              00084 ADIF      equ    0x1      ;16C71 ADCN0 register bits
0000              00085 ADON      equ    0x0      ;16C71 ADCN0 register bits
0001              00086 PCFG1     equ    0x1      ;16C71 ADCN1 register bits
0000              00087 PCFG0     equ    0x0      ;16C71 ADCN1 register bits
```

```
MPASM 01.20 Released              MAIN.ASM   8-10-1995 21:07:15         PAGE  3
Dual Level Thermostat Program June, 1995

LOC  OBJECT CODE      LINE SOURCE TEXT
     VALUE

00088 ;
                      00089 ;
     0001             00090 Same    equ     0x1
                      00091 ;
     0000             00092 LSB     equ     0x0
     0007             00093 MSB     equ     0x7
                      00094 ;
     0001             00095 TRUE    equ     0x1
     0001             00096 YES     equ     0x1
     0000             00097 FALSE   equ     0x0
     0000             00098 NO      equ     0x0
                      00099 ;
                      00100 ;************************************************************
                      00101         LIST
                      00102
                      00103
                      00012 #include ports.equ       ; Equates
                      00001 ; ------------------------------------------------------------
                      00002
                      00003 ; File Name: PORTS.EQU         Ports
                      00004
                      00005 ; ------------------------------------------------------------
                      00006
                      00007 ; Define 'TestFast' to speed up operation of timers as defined in this
                      00008 ; module below to facilitate faster testing. Comment out for Production
                      00009 ; version of operation.
                      00010 ; #define TestFast
                      00011
                      00012 ; ------------------------------------------------------------
                      00013
                      00014 ; Define 'UseEEPROM' to use the EEProm.
                      00015 ; Makes changes in INIT.ASM, EEPROMRW.ASM, CONTROL.ASM, and
                      00016 ; MAIN.ASM (controls inclusion of EEPROM.ASM & EEPROMRW.ASM)
                      00017 #define UseEEPROM
                      00018
                      00019 ; ------------------------------------------------------------
                      00020
                      00021 ; Define HCBOTHON if EEProm is to be initialized when both the
                      00022 ; Heat & Cool switches are both on when CPU restarts.
                      00023 ; HCBOTHON is NOT defined if EEProm is to be initialized when both the
                      00024 ; Heat & Cool switches are both off when CPU restarts.
                      00025 ; #define HCBOTHON
                      00026
                      00027 ; ------------------------------------------------------------
                      00028
     000C             00029 TEMP    equ     0x0c    ; Temporary Storage
     000D             00030 TEMP1   equ     0x0d    ; Temporary Storage
     000E             00031 TEMP2   equ     0x0e    ; Temporary Storage
     000F             00032 TEMP3   equ     0x0f    ; Temporary Storage
```

MPASM 01.20 Released          MAIN.ASM  8-10-1995 21:07:15       PAGE 4
Dual Level Thermostat Program June, 1995

LOC  OBJECT CODE    LINE SOURCE TEXT
     VALUE 0010           00033 TEMP4    equ    0x10     ; Temporary Storage
     0011           00034 INDEX    equ    0x11     ; Index used for A/D Table & Temperature Table
     000D           00035 LCD1     equ    TEMP1    ; LCD Segment Data 1st (Left) Digit
     000E           00036 LCD2     equ    TEMP2    ; LCD Segment Data 2nd Digit
     000F           00037 LCD3     equ    TEMP3    ; LCD Segment Data 3rd Digit
     0010           00038 LCD4     equ    TEMP4    ; LCD Segment Data 4nd (Right) Digit
                    00039
                    00040 ; -----------------------------------------------------------------
                    00041
                    00042 ; Following used by Initialization:
     001F           00043 PORTADIR equ b'00011111' ; Port A all as inputs
                    00044
                    00045 ; Following used by Initialization, LCD Operation, and EEProm:
     00C5           00046 PORTBRD  equ b'11000101' ; Port B Read  SDATA  b'xxxxx01x'
     00C1           00047 PORTBWT  equ b'11000001' ; Port B Write SDATA  b'xxxxx00x'
                    00048
                    00049 ; -----------------------------------------------------------------
                    00050
                    00051 ; For EEPROM.ASM
     0012           00052 ES       equ    0x12     ; First Scratch Ram Address
     0012           00053 EEPROM   equ    ES+0     ; bit buffer
     0013           00054 BYCNT    equ    ES+1     ; byte counter for read mode
     0014           00055 ADDR     equ    ES+2     ; address counter
     0015           00056 DATAI    equ    ES+3     ; data input register
     0016           00057 DATAO    equ    ES+4     ; data output register
     0017           00058 TXBUF    equ    ES+5     ; transmit buffer
     0018           00059 COUNT    equ    ES+6     ; bit counter
     0019           00060 BCOUNT   equ    ES+7     ; byte counter
     001A           00061 LOOPS    equ    ES+8     ; delay loop counter
     001B           00062 LOOPS2   equ    ES+9     ; delay loop counter
                    00063
                    00064 ; -----------------------------------------------------------------
                    00065
     001C           00066 A2DTMR   equ    ES+10    ; delay for A/D samples
     001D           00067 COMPTIMRL equ   ES+11    ; Compressor Restart Timer Low Half
     001E           00068 COMPTIMRH equ   ES+12    ; Compressor Restart Timer High Half
     001F           00069 SAVDHTCO equ    ES+13    ; Saved Heat/Cool Switches (Port B)
                    00070
                    00071 ; -----------------------------------------------------------------
                    00072
     0020           00073 SAVLCD1  equ    ES+14    ; Saved LCD1
     0021           00074 SAVLCD2  equ    ES+15    ; Saved LCD2
                    00075
                    00076 ; -----------------------------------------------------------------
                    00077
     0022           00078 TIMEOUT  equ    ES+16    ; Binary Occupant Time Out Timer
     0023           00079 FLAGS    equ    ES+17    ; Operation Flags
                    00080                          ; Bit 0: 0 = Owner Mode, 1 = Occupant Mode
                    00081                          ; Bit 1: 1 = indicate that a switch has been on
```

```
MPASM 01.20 Released              MAIN.ASM  8-10-1995  21:07:15        PAGE  5
Dual Level Thermostat Program June, 1995

LOC  OBJECT CODE    LINE SOURCE TEXT
     VALUE
                    00082                             ;         else = 0
                    00083                             ; Bit 2: 1 = Low Battery, else 0
                    00084                             ; Bit 6 & 7 = Lo Battery Display Timer
                    00085
0024                00086 MAXINDX   equ    ES+18      ; Maximum Working Index
0025                00087 SAVSWA    equ    ES+19      ; Saved Switches A
0026                00088 SAVSWB    equ    ES+20      ; Saved Switches B
                    00089
                    00090 ; ------------------------------------------------------------------
                    00091
0027                00092 OCTMPHE   equ    ES+21      ; Index for Occupant Temp Heat Index
0028                00093 OCTMPCO   equ    ES+22      ; Index for Occupant Temp Cool Index
                    00094
0029                00095 OWTMPHE   equ    ES+23      ; Index for Owner Temp Heat Index
002A                00096 OWTMPCO   equ    ES+24      ; Index for Owner Temp Cool Index
002B                00097 OWTIMOUT  equ    ES+25      ; Owner Time Out Index
                    00098
002C                00099 MAXINDEX  equ    ES+26      ; Maximum index for value being set
002D                00100 MININDEX  equ    ES+27      ; Minimum index for value being set
                    00101
002E                00102 CURINDEX  equ    ES+28      ; Index for current temerature
002F                00103 WKGINDEX  equ    ES+29      ; Index for working Heat/Cool-Occupant/Owner
                    00104
                    00105 ; ES+29 is last CPU REGISTER!
                    00106
                    00107 ; ------------------------------------------------------------------
                    00108
0005                00109 SWPOWER   equ    5          ; Port B bit for Switch Power Control (1=On)
                    00110
                    00111 ; ------------------------------------------------------------------
                    00112
                    00113  ifdef TestFast
                    00114
                    00115 ; Accelerated Initialization for A/D Sampling and Compressor Timers
                    00116 ;     (Testing Only)
                    00117 A2DTMRSET  equ   2 * 2   ; A/D Sampling Timer for .5 Sec * 2 = 2 Seconds
                    00118 COMPTMRSET equ   2 * 2   ; Compressor   Timer for .5 Sec * 2 = 2 Seconds
                    00119
                    00120  else
                    00121
                    00122 ; Normal Initialization for A/D Sampling and Compressor Timers
                    00123 ;     (Production)
0078                00124 A2DTMRSET  equ   (60 * 2) ; A/D Sampling Timer for .5 Sec * 60 = 60 Seconds
0268                00125 COMPTMRSET equ   (60 * 2 * 3) + 0x100
                    00126                           ; Compressor Timer for .5 Sec * 3 * 60 = 180
Seconds
                    00127
                    00128  endif
                    00129
                    00130 ; ------------------------------------------------------------------
```

```
MPASM 01.20 Released              MAIN.ASM  8-10-1995 21:07:15       PAGE   6
Dual Level Thermostat Program June, 1995

LOC  OBJECT CODE     LINE  SOURCE TEXT
     VALUE 00131
001D                 00132 MAXTMPINDEX    equ (30-1); Max index for temperatures
0001                 00133 MINTMPINDEX    equ 1      ; Min temperature index
                     00134
0013                 00135 MAXTIMINDEX    equ 19     ; Max index for timer values
0000                 00136 MINTIMINDEX    equ 0      ; Min timer index
                     00137
000C                 00138 IOCTMPHE equ   (72-60)  ; Index for Occupant Temp Heat Index
0012                 00139 IOCTMPCO equ   (78-60)  ; Index for Occupant Temp Cool Index
                     00140
0005                 00141 IOWTMPHE equ   (65-60)  ; Index for Owner Temp Heat Index
0014                 00142 IOWTMPCO equ   (80-60)  ; Index for Owner Temp Cool Index
000B                 00143 IOWTIMOUT equ  11       ; Owner Time Out Index (60 Minutes)
                     00144
                     00145 ; ------------------------------------------------------------
                     00146
0040                 00147 DISPINIT equ   b'01000000' ; Display pattern for temp adjust "-"
                     00148
0040                 00149 DISPTADJ equ   b'01000000' ; Display pattern for temp adjust "-"
0036                 00150 DISPCADJ equ   b'00110110' ; Display pattern for time (clock) adjust "||"
                     00151
                     00152
001C                 00153 AKEYSMASK equ  b'00011100' ; Mask for programming keys on Port A
00C0                 00154 BKEYSMASK equ  b'11000000' ; Mask for programming keys on Port B
                     00155
                     00156 ; ------------------------------------------------------------
                     00157
0002                 00158 SWAINC   equ   2        ; Switch Increase on A Bank (Active Low)
0003                 00159 SWADEC   equ   3        ; Switch Decrease on A Bank (Active Low)
0004                 00160 SWAKEY   equ   4        ; Switch Key Lock on A Bank (Active Low)
                     00161
0006                 00162 SWBHEAT  equ   6        ; Switch Heat on B Bank (Active Low)
0007                 00163 SWBCOOL  equ   7        ; Switch Cool on B Bank (Active Low)
00C0                 00164 HTORCOL  equ   0xc0     ; Mask for Heat & Cool Switches
                     00165
0004                 00166 POWERON  equ   4        ; Bit on B Bank to turn on Power (On=1)
                     00167
                     00168 ; ------------------------------------------------------------
                     00169
0190                 00170 LOBATVOLT equ  400 ; Lo Battery Voltage * 100
0071                 00171 LOBATCNTS equ  (0x100 * LOBATVOLT / 300 / 3) ; Integer Math
                     00172                ; A/D counts for lo battery for
                     00173                ; Vcc = 3.0V, Lo Battery = 4.0V, 3:1 Voltage Divider
                     00174
                     00175 ; ------------------------------------------------------------
                     00176
0038                 00177 LCD_LTR_L equ  b'00111000' ; Segments for 'L'
007C                 00178 LCD_LTR_b equ  b'01111100' ; Segments for 'b'
                     00179
```

```
MPASM 01.20 Released           MAIN.ASM   8-10-1995  21:07:15        PAGE   7
Dual Level Thermostat Program June, 1995

LOC  OBJECT CODE    LINE SOURCE TEXT
     VALUE

00180 ; -----------------------------------------------------------------
                    00013
                    00014 ; -----------------------------------------------------------------
                    00015
0000                00016       org     0x00
                    00017 ; Cold Start Here:
0000                00018 ColdStart
0000 20B3           00019       call    InitPorts       ; Initialize Ports
                    00020
0001 2171           00021       call    Control         ; Go start control now
                    00022
0002 178B           00023       bsf     INTCON, GIE     ; Global interrupt enabled
                    00024
                    00025 ; -----------------------------------------------------------------
                    00026
                    00027 ; Forever loop that does nothing except wait for interrupt.
0003                00028 Quit
0003 2803           00029       goto    Quit            ; Test loop
                    00030
                    00031 ; -----------------------------------------------------------------
                    00032
0004                00033       org     0x04
                    00034 ; Interrupt Processing Entry:
0004                00035 IntVector
0004 190B           00036       btfsc   INTCON, T0IF    ; Check Timer 0 Interrupt
0005 280E           00037       goto    ProcTimerInt    ; Go process Timer 0 Interrupt
                    00038
                    00039 ; Motion Sensor External Interrupt:
0006 108B           00040       bcf     INTCON, INTF    ; Clear External Interrupt
                    00041
0007 18A3           00042       btfsc   FLAGS, 1        ; See if settings being changed
0008 0009           00043       retfie                  ; Return from interrupt
                    00044
0009 20D6           00045       call    LoadTimeout     ; Load timeout minutes into TIMEOUT.
                    00046
                    00047       ; Indicate that motion sensor working:
000A 178F           00048       bsf     LCD3,7          ; Or DP into the digit
000B 1790           00049       bsf     LCD4,7          ; Or DP into the digit
                    00050
000C 20FE           00051       call    LcdDisplay      ; display the data
                    00052
000D 0009           00053       retfie                  ; Return from interrupt
                    00054
                    00055 ; Timer Interrupt Processing:
000E                00056 ProcTimerInt
000E 110B           00057       bcf     INTCON, T0IF    ; Clear Timer 0 Interrupt
                    00058
000F 3040           00059       movlw   b'01000000'     ; Prepare to:
0010 07A3           00060       addwf   FLAGS, 1        ; Work the Lo Battery Display Timer
```

```
MPASM 01.20 Released           MAIN.ASM   8-10-1995  21:07:15        PAGE  8
Dual Level Thermostat Program June, 1995

LOC  OBJECT CODE    LINE SOURCE TEXT
     VALUE 00061
0011 2171           00062      call    Control         ; Go do control
                    00063
0012 0009           00064      retfie                  ; Return from interrupt
                    00065
                    00066 ; ----------------------------------------------------------------
                    00067
                    00068 #include tables.asm       ; Lookup Tables..... MUST DO ME FIRST!!!
                    00001 ; ----------------------------------------------------------------
                    00002
                    00003 ; File Name: TABLES.ASM      Look up tables
                    00004 ; Important: This must be located in the first 256 address locations
                    00005 ; of program memory in order to set PCLATH to 0.
                    00006
                    00007 ; ----------------------------------------------------------------
                    00008
                    00009 ; Convert Index to Binary A/D value.
                    00010 ; On Entry: W is index 0-30
                    00011 ; On Exit: W contains the looked up A/D value
0013                00012 Index2AD
0013 018A           00013      clrf    PCLATH          ; Point to first page
0014 0782           00014      addwf   PCL, 1          ; Jump to index
0015 349B           00015      retlw   d'155'          ; A/D for 60 Degrees F
0016 3499           00016      retlw   d'153'          ; A/D for 61 Degrees F
0017 3498           00017      retlw   d'152'          ; A/D for 62 Degrees F
0018 3496           00018      retlw   d'150'          ; A/D for 63 Degrees F
0019 3495           00019      retlw   d'149'          ; A/D for 64 Degrees F
001A 3493           00020      retlw   d'147'          ; A/D for 65 Degrees F
001B 3491           00021      retlw   d'145'          ; A/D for 66 Degrees F
001C 3490           00022      retlw   d'144'          ; A/D for 67 Degrees F
001D 348E           00023      retlw   d'142'          ; A/D for 68 Degrees F
001E 348D           00024      retlw   d'141'          ; A/D for 69 Degrees F
001F 348B           00025      retlw   d'139'          ; A/D for 70 Degrees F
0020 348A           00026      retlw   d'138'          ; A/D for 71 Degrees F
0021 3488           00027      retlw   d'136'          ; A/D for 72 Degrees F
0022 3486           00028      retlw   d'134'          ; A/D for 73 Degrees F
0023 3485           00029      retlw   d'133'          ; A/D for 74 Degrees F
0024 3483           00030      retlw   d'131'          ; A/D for 75 Degrees F
0025 3482           00031      retlw   d'130'          ; A/D for 76 Degrees F
0026 3480           00032      retlw   d'128'          ; A/D for 77 Degrees F
0027 347F           00033      retlw   d'127'          ; A/D for 78 Degrees F
0028 347D           00034      retlw   d'125'          ; A/D for 79 Degrees F
0029 347B           00035      retlw   d'123'          ; A/D for 80 Degrees F
002A 347A           00036      retlw   d'122'          ; A/D for 81 Degrees F
002B 3478           00037      retlw   d'120'          ; A/D for 82 Degrees F
002C 3477           00038      retlw   d'119'          ; A/D for 83 Degrees F
002D 3475           00039      retlw   d'117'          ; A/D for 84 Degrees F
002E 3474           00040      retlw   d'116'          ; A/D for 85 Degrees F
002F 3472           00041      retlw   d'114'          ; A/D for 86 Degrees F
```

```
MPASM 01.20 Released          MAIN.ASM  8-10-1995 21:07:15        PAGE  9
Dual Level Thermostat Program June, 1995

LOC  OBJECT CODE    LINE SOURCE TEXT
     VALUE 0030 3471           00042        retlw    d'113'         ; A/D for 87 Degrees F
0031 346F           00043        retlw    d'111'         ; A/D for 88 Degrees F
0032 346E           00044        retlw    d'110'         ; A/D for 89 Degrees F
0033 346C           00045        retlw    d'108'         ; A/D for 90 Degrees F
                    00046
                    00047 ; ----------------------------------------------------------------
                    00048
                    00049 ; Convert Index to Degrees F value in Packed BCD.
                    00050 ; On Entry: W is index 0-30
                    00051 ; On Exit: W contains the looked up Packed BCD Degrees F value
0034                00052 Index2Deg
0034 018A           00053        clrf     PCLATH         ; Point to first page
0035 0782           00054        addwf    PCL, 1         ; Jump to index
0036 3460           00055        retlw    0x60           ; 60 Degrees F
0037 3461           00056        retlw    0x61           ; 61 Degrees F
0038 3462           00057        retlw    0x62           ; 62 Degrees F
0039 3463           00058        retlw    0x63           ; 63 Degrees F
003A 3464           00059        retlw    0x64           ; 64 Degrees F
003B 3465           00060        retlw    0x65           ; 65 Degrees F
003C 3466           00061        retlw    0x66           ; 66 Degrees F
003D 3467           00062        retlw    0x67           ; 67 Degrees F
003E 3468           00063        retlw    0x68           ; 68 Degrees F
003F 3469           00064        retlw    0x69           ; 69 Degrees F
0040 3470           00065        retlw    0x70           ; 70 Degrees F
0041 3471           00066        retlw    0x71           ; 71 Degrees F
0042 3472           00067        retlw    0x72           ; 72 Degrees F
0043 3473           00068        retlw    0x73           ; 73 Degrees F
0044 3474           00069        retlw    0x74           ; 74 Degrees F
0045 3475           00070        retlw    0x75           ; 75 Degrees F
0046 3476           00071        retlw    0x76           ; 76 Degrees F
0047 3477           00072        retlw    0x77           ; 77 Degrees F
0048 3478           00073        retlw    0x78           ; 78 Degrees F
0049 3479           00074        retlw    0x79           ; 79 Degrees F
004A 3480           00075        retlw    0x80           ; 80 Degrees F
004B 3481           00076        retlw    0x81           ; 81 Degrees F
004C 3482           00077        retlw    0x82           ; 82 Degrees F
004D 3483           00078        retlw    0x83           ; 83 Degrees F
004E 3484           00079        retlw    0x84           ; 84 Degrees F
004F 3485           00080        retlw    0x85           ; 85 Degrees F
0050 3486           00081        retlw    0x86           ; 86 Degrees F
0051 3487           00082        retlw    0x87           ; 87 Degrees F
0052 3488           00083        retlw    0x88           ; 88 Degrees F
0053 3489           00084        retlw    0x89           ; 89 Degrees F
0054 3490           00085        retlw    0x90           ; 90 Degrees F
                    00086
                    00087 ; ----------------------------------------------------------------
                    00088
                    00089 ; Convert Hex to Segments.
                    00090 ; On Entry: W is two hex digits
```

```
MPASM 01.20 Released            MAIN.ASM   8-10-1995  21:07:15         PAGE 10
Dual Level Thermostat Program June, 1995

LOC  OBJECT CODE     LINE SOURCE TEXT
     VALUE

00091 ;         TEMP is don't care
                     00092 ; On Exit: W contains the segments
                     00093 ;          TEMP contains the original two hex digits
                     00094 ;
                     00095 ;
                     00096 ; Segment Layout:
                     00097 ;
                     00098 ;          00
                     00099 ;         5  1
                     00100 ;         5  1
                     00101 ;          66
                     00102 ;         4  2
                     00103 ;         4  2
                     00104 ;         7 33
                     00105 ;
0055                 00106 Hex2SegHi ; Convert Hi nibble in W:
0055 008C            00107         movwf   TEMP            ; Prepare to swap
0056 0E0C            00108         swapf   TEMP,W          ; Get Hi Nibble into Lo Nibble
0057                 00109 Hex2SegLo ; Convert LO nibble in W:
0057 390F            00110         andlw   0x0f            ; Get lo nibble only
0058 018A            00111         clrf    PCLATH          ; Point to first page
0059 0782            00112         addwf   PCL, 1          ; Jump to index
005A 343F            00113         retlw   b'00111111'     ; Segments for 0
005B 3406            00114         retlw   b'00000110'     ; Segments for 1
005C 345B            00115         retlw   b'01011011'     ; Segments for 2
005D 344F            00116         retlw   b'01001111'     ; Segments for 3
005E 3466            00117         retlw   b'01100110'     ; Segments for 4
005F 346D            00118         retlw   b'01101101'     ; Segments for 5
0060 347D            00119         retlw   b'01111101'     ; Segments for 6
0061 3407            00120         retlw   b'00000111'     ; Segments for 7
0062 347F            00121         retlw   b'01111111'     ; Segments for 8
0063 3467            00122         retlw   b'01100111'     ; Segments for 9
0064 3477            00123         retlw   b'01110111'     ; Segments for A
0065 347C            00124         retlw   b'01111100'     ; Segments for B
0066 3439            00125         retlw   b'00111001'     ; Segments for C
0067 345E            00126         retlw   b'01011110'     ; Segments for D
0068 3479            00127         retlw   b'01111001'     ; Segments for E
0069 3471            00128         retlw   b'01110001'     ; Segments for F
                     00129
                     00130 ; ------------------------------------------------------------------
                     00131
                     00132 ; Convert Index to Delay Minutes value in Packed BCD.
                     00133 ; On Entry: W is index 0-19
                     00134 ; On Exit: W contains the looked up Packed Delay Minutes value
006A                 00135 Index2DispMin
006A 018A            00136         clrf    PCLATH          ; Point to first page
006B 0782            00137         addwf   PCL, 1          ; Jump to index
006C 3405            00138         retlw   0x05            ;  5 Minutes
006D 3410            00139         retlw   0x10            ; 10 Minutes
```

```
MPASM 01.20 Released           MAIN.ASM   8-10-1995  21:07:15        PAGE 11
Dual Level Thermostat Program June, 1995

LOC  OBJECT CODE    LINE SOURCE TEXT
     VALUE 006E 3415           00140       retlw   0x15        ; 15 Minutes
006F 3420           00141       retlw   0x20        ; 20 Minutes
0070 3425           00142       retlw   0x25        ; 25 Minutes
0071 3430           00143       retlw   0x30        ; 30 Minutes
0072 3435           00144       retlw   0x35        ; 35 Minutes
0073 3440           00145       retlw   0x40        ; 40 Minutes
0074 3445           00146       retlw   0x45        ; 45 Minutes
0075 3450           00147       retlw   0x50        ; 50 Minutes
0076 3455           00148       retlw   0x55        ; 55 Minutes
0077 3460           00149       retlw   0x60        ; 60 Minutes
0078 3465           00150       retlw   0x65        ; 65 Minutes
0079 3470           00151       retlw   0x70        ; 70 Minutes
007A 3475           00152       retlw   0x75        ; 75 Minutes
007B 3480           00153       retlw   0x80        ; 80 Minutes
007C 3485           00154       retlw   0x85        ; 85 Minutes
007D 3490           00155       retlw   0x90        ; 90 Minutes
007E 3495           00156       retlw   0x95        ; 95 Minutes
007F 3499           00157       retlw   0x99        ; 99 Minutes
                    00158
                    00159 ; -----------------------------------------------------------
                    00160
                    00161 ; Convert Index to Delay Minutes value in Binary
                    00162 ; On Entry: W is index 0-19
                    00163 ; On Exit: W contains the looked up Binaru Delay Minutes value
0080                00164 Index2BinMin
0080 018A           00165       clrf    PCLATH      ; Point to first page
0081 0782           00166       addwf   PCL, 1      ; Jump to index
0082 3405           00167       retlw   d'5'        ;  5 Minutes
0083 340A           00168       retlw   d'10'       ; 10 Minutes
0084 340F           00169       retlw   d'15'       ; 15 Minutes
0085 3414           00170       retlw   d'20'       ; 20 Minutes
0086 3419           00171       retlw   d'25'       ; 25 Minutes
0087 341E           00172       retlw   d'30'       ; 30 Minutes
0088 3423           00173       retlw   d'35'       ; 35 Minutes
0089 3428           00174       retlw   d'40'       ; 40 Minutes
008A 342D           00175       retlw   d'45'       ; 45 Minutes
008B 3432           00176       retlw   d'50'       ; 50 Minutes
008C 3437           00177       retlw   d'55'       ; 55 Minutes
008D 343C           00178       retlw   d'60'       ; 60 Minutes
008E 3441           00179       retlw   d'65'       ; 65 Minutes
008F 3446           00180       retlw   d'70'       ; 70 Minutes
0090 344B           00181       retlw   d'75'       ; 75 Minutes
0091 3450           00182       retlw   d'80'       ; 80 Minutes
0092 3455           00183       retlw   d'85'       ; 85 Minutes
0093 345A           00184       retlw   d'90'       ; 90 Minutes
0094 345F           00185       retlw   d'95'       ; 95 Minutes
0095 3463           00186       retlw   d'99'       ; 99 Minutes
                    00187
                    00188 ; -----------------------------------------------------------
```

MPASM 01.20 Released          MAIN.ASM    8-10-1995  21:07:15           PAGE 12
Dual Level Thermostat Program June, 1995

LOC  OBJECT CODE    LINE  SOURCE TEXT
     VALUE 00189
                    00190 ; Convert W Hex to Segments and store in Left Display
                    00191 ; On Entry: W is two hex digits
                    00192 ;           TEMP is don't care
                    00193 ; On Exit: W contains the segments
                    00194 ;          TEMP contains the original two hex digits
                    00195 ;          LCD1 & LCD2 contain the segment patterns
                    00196
0096                00197 Hex2SegLeft
0096 2055           00198         call    Hex2SegHi       ; Convert Hi Nibble to Hex data
0097 008D           00199         movwf   LCD1            ; Save the digit
0098 080C           00200         movf    TEMP, W         ; Load Hex data again
                    00201
0099 2057           00202         call    Hex2SegLo       ; Convert Lo Nibble to Hex data
009A 008E           00203         movwf   LCD2            ; Save the digit
009B 080C           00204         movf    TEMP, W         ; Load Hex data again
                    00205
009C 0008           00206         return                  ; Exit subroutine
                    00207
                    00208 ; ------------------------------------------------------------------
                    00209
                    00210 ; Convert W Hex to Segments and store in Right Display
                    00211 ; On Entry: W is two hex digits
                    00212 ;           TEMP is don't care
                    00213 ; On Exit: W contains the segments
                    00214 ;          TEMP contains the original two hex digits
                    00215 ;          LCD3 & LCD4 contain the segment patterns
                    00216
009D                00217 Hex2SegRight
009D 2055           00218         call    Hex2SegHi       ; Convert Hi Nibble to Hex data
009E 008F           00219         movwf   LCD3            ; Save the digit
009F 080C           00220         movf    TEMP, W         ; Load Hex data again
                    00221
00A0 2057           00222         call    Hex2SegLo       ; Convert Lo Nibble to Hex data
00A1 0090           00223         movwf   LCD4            ; Save the digit
00A2 080C           00224         movf    TEMP, W         ; Load Hex data again
                    00225
00A3 0008           00226         return                  ; Exit subroutine
                    00227
                    00228 ; ------------------------------------------------------------------
                    00229
                    00230 ; Convert W Hex to Segments and store in Left Display & Display
                    00231 ; On Entry: W is two hex digits
                    00232 ;           TEMP is don't care
                    00233 ; On Exit: W contains the original two hex digits
                    00234 ;          TEMP contains the original two hex digits
                    00235 ;          LCD1 & LCD1 contain the segment patterns
                    00236
00A4                00237 DisplayHexLeft

```
MPASM 01.20 Released          MAIN.ASM   8-10-1995  21:07:15        PAGE 13
Dual Level Thermostat Program June, 1995

LOC  OBJECT CODE      LINE SOURCE TEXT
     VALUE

00A4 2096             00238        call    Hex2SegLeft    ; Convert Hex to Segments
                      00239
00A5 28FE             00240        goto    LcdDisplay     ; display the data
                      00241                               ; return from there
                      00242 ; ---------------------------------------------------------------
                      00243
                      00244 ; Convert W Hex to Segments and store in Right Display & Display
                      00245 ; On Entry: W is two hex digits
                      00246 ;           TEMP is don't care
                      00247 ; On Exit: W contains the original two hex digits
                      00248 ;          TEMP contains the original two hex digits
                      00249 ;          LCD3 & LCD4 contain the segment patterns
                      00250
00A6                  00251 DisplayHexRight
00A6 209D             00252        call    Hex2SegRight   ; Convert Hex to Segments
                      00253
00A7 28FE             00254        goto    LcdDisplay     ; display the data
                      00255                               ; return from there
                      00256
                      00257 ; ---------------------------------------------------------------
                      00258
                      00069 #include convert.asm
                      00001 ; ---------------------------------------------------------------
                      00002
                      00003 ; File Name: CONVERT.ASM       Data Type Conversions
                      00004
                      00005 ; ---------------------------------------------------------------
                      00006
                      00007 ; Convert A/D value to Index
                      00008 ; On Entry: Ram ADRES contains A/D value to be converted
                      00009 ;           W = Don't Care
                      00010 ;           Ram INDEX = Don't Care
                      00011 ; On Exit:  Ram ADRES contains A/D value to be converted (unchanged)
                      00012 ;           W = INDEX
                      00013 ;           Ram INDEX = Index corresponding to A/D Value
                      00014
00A8                  00015 A2D2Index
00A8 301E             00016        movlw   30             ; Max Index
00A9 0091             00017        movwf   INDEX          ; Load Index value
00AA                  00018 A2D2Index1
00AA 0811             00019        movf    INDEX, W       ; Get current Index
00AB 2013             00020        call    Index2AD       ; Get A/D for current Index
00AC 0209             00021        subwf   ADRES, W       ; Compare Data
00AD 1C03             00022        btfss   STATUS, C      ; Skip if Negative (Not found)
00AE 28B1             00023        goto    A2D2Index2     ; Go return Index
00AF 0B91             00024        decfsz  INDEX, 1       ; Work Index
00B0 28AA             00025        goto    A2D2Index1     ; Loop to next Index value
00B1                  00026 A2D2Index2
00B1 0811             00027        movf    INDEX, W       ; Get Index value
```

```
MPASM 01.20 Released           MAIN.ASM    8-10-1995  21:07:15        PAGE 14
Dual Level Thermostat Program June, 1995

LOC  OBJECT CODE   LINE SOURCE TEXT
    VALUE

00B2 0008          00028        return              ; Exit with Index in W
                   00029
                   00030 ; ------------------------------------------------------------
                   00031
                   00070 #include init.asm
                   00001 ; ------------------------------------------------------------
                   00002
                   00003 ; File Name: INIT.ASM         Initialization Routines
                   00004
                   00005 ; ------------------------------------------------------------
                   00006
                   00007 ; Initialize Ports
                   00008
00B3               00009 InitPorts
                   00010       ; ------------------------------------------------------
                   00011       ; INITIALIZATION FOR PAGE 1:
                   00012
00B3 1683          00013       bsf    STATUS, 5       ; Select Page 1
                   00014
00B4 301F          00015       movlw  b'00011111'     ; All as inputs
00B5 0085          00016       movwf  TRISA           ; For Port A
                   00017
00B6 30C5          00018       movlw  PORTBRD         ; Inputs & Outputs
00B7 0086          00019       movwf  TRISB           ; For Port B
                   00020
                   00021       ; Following are possible timer prescaler settings:
                   00022       ; movlw   b'10001000'     ; Options No Prescaler (/256 = 32 Hz)
                   00023       ; movlw   b'10000000'     ; Options Prescaler Used (/512 = 16 Hz)
                   00024       ; movlw   b'10000001'     ; Options Prescaler Used (/1024 = 8 Hz)
                   00025       ; movlw   b'10000011'     ; Options Prescaler Used (/4096 = 2 Hz)
                   00026       ; movlw   b'10000100'     ; Options Prescaler Used (/8192 = 1 Hz)
                   00027
00B8 3083          00028       movlw  b'10000011'     ; Options Prescaler Used (/4096 = 2 Hz)
00B9 0081          00029       movwf  OPTION_R        ; For OPTIONS
                   00030
                   00031       ; ------------------------------------------------------
                   00032       ; INITIALIZATION FOR PAGE 0:
                   00033
00BA 1283          00034       bcf    STATUS, 5       ; Select Page 0
                   00035
00BB 3030          00036       movlw  b'00110000'     ; Interrupt Control
00BC 008B          00037       movwf  INTCON          ; For Interrupts
                   00038
                   00039       ; ------------------------------------------------------
                   00040       ; RAM INITIALIZATION:
                   00041
00BD 01A3          00042       clrf   FLAGS           ; Clear Operation Flags
00BE 019C          00043       clrf   A2DTMR          ; Clear the A/D timer
00BF 01A2          00044       clrf   TIMEOUT         ; Binary Occupant Time Out Timer
```

```
MPASM 01.20 Released           MAIN.ASM  8-10-1995 21:07:15        PAGE 15
Dual Level Thermostat Program June, 1995

LOC  OBJECT CODE    LINE SOURCE TEXT
  VALUE

00C0 019D           00045           clrf    COMPTIMRL       ; Compressor Restart Timer Lo
00C1 019E           00046           clrf    COMPTIMRH       ; Compressor Restart Timer Hi
                    00047
00C2 01A0           00048           clrf    SAVLCD1         ; SAVLCD1
00C3 01A1           00049           clrf    SAVLCD2         ; SAVLCD2
                    00050
                    00051   ; ------------------------------------------------------------
                    00052
                    00053           ; Initialize the CPU RAM with factory values:
00C4 20DA           00054           call    InitCPURAM      ; Load Ram with values
                    00055
                    00056   ifdef UseEEPROM
                    00057   ifdef HCBOTHON
                    00058           ; Check for both Heat & Cool Switches on at same time as
                    00059           ; command to do factory initialize the EEProm:
                    00060           btfsc   SAVSWB, SWBHEAT ; Switch Heat on B Bank (Active Low)
                    00061           goto    NoInit          ; Skip if is on
                    00062           btfsc   SAVSWB, SWBCOOL ; Switch Cool on B Bank (Active Low)
                    00063           goto    NoInit          ; Skip if is on
                    00064   else
                    00065           ; Check for both Heat & Cool Switches off at same time as
                    00066           ; command to do factory initialize the EEProm:
00C5 1F26           00067           btfss   SAVSWB, SWBHEAT ; Switch Heat on B Bank (Active Low)
00C6 28D0           00068           goto    NoInit          ; Skip if is off
00C7 1FA6           00069           btfss   SAVSWB, SWBCOOL ; Switch Cool on B Bank (Active Low)
00C8 28D0           00070           goto    NoInit          ; Skip if is off
                    00071   endif
                    00072
00C9                00073   DoInit
                    00074           ; Initialize the EEPROM with factory values:
00C9 227F           00075           call    SaveEeprom      ; Save the CPU Ram values to EEPPROM
                    00076
00CA 3040           00077           movlw   DISPINIT        ; Display pattern for Initialization "-"
00CB 008D           00078           movwf   LCD1            ; LCD Segment Data 1st Digit
00CC 008E           00079           movwf   LCD2            ; LCD Segment Data 2nd Digit
00CD 008F           00080           movwf   LCD3            ; LCD Segment Data 3rd Digit
00CE 0090           00081           movwf   LCD4            ; LCD Segment Data 4th Digit
                    00082
00CF 20FE           00083           call    LcdDisplay      ; display the data
                    00084
                    00085   endif
                    00086
                    00087   ; ------------------------------------------------------------
                    00088
00D0                00089   NoInit
                    00090
                    00091   ifdef UseEEPROM
                    00092           ; Read the EEPPROM factory values into CPU Ram:
00D0 228C           00093           call    RecallEeprom
```

MPASM 01.20 Released        MAIN.ASM    8-10-1995 21:07:15        PAGE 16
Dual Level Thermostat Program June, 1995

LOC  OBJECT CODE    LINE SOURCE TEXT
     VALUE 00094  endif
                    00095
                    00096      ; ------------------------------------------------------------
                    00097
00D1 2116           00098          call    ReadSwitches    ; Read and save switches
00D2 0826           00099          movfw   SAVSWB          ; Get Saved Switches B
00D3 009F           00100          movwf   SAVDHTCO        ; Save Last setting of Switches B
                    00101
                    00102      ; ------------------------------------------------------------
                    00103
00D4 20E7           00104          call    InitADPort      ; Initialize A/D Ports
                    00105
                    00106      ; ------------------------------------------------------------
                    00107
                    00108      ; The following is done in the MAIN.ASM startup section 'ColdStart'
                    00109      ; after all initialization has been done:
                    00110      ; bsf     INTCON, GIE       ; Global interrupt enabled
                    00111
00D5 0008           00112          return                  ; Return from subroutine
                    00113
                    00114  ; ------------------------------------------------------------
                    00115
                    00116  ; Load the Binary Occupant Time Out Timer.
                    00117  ; Converts the index in OWTIMOUT into minutes & stores in TIMEOUT.
                    00118
00D6                00119  LoadTimeout
00D6 082B           00120          movfw   OWTIMOUT        ; Get the Timeout Index
00D7 2080           00121          call    Index2BinMin    ; Convert Index to Minutes
00D8 00A2           00122          movwf   TIMEOUT         ; Save the Binary minutes in timer
                    00123
00D9 0008           00124          return                  ; Return from subroutine
                    00125
                    00126  ; ------------------------------------------------------------
                    00127
                    00128  ; Initialize the CPU RAM with factory values:
00DA                00129  InitCPURAM
00DA 3000           00130          movlw   0               ; First Address
00DB 0094           00131          movwf   ADDR            ; Point to address
                    00132
00DC 300C           00133          movlw   IOCTMPHE        ; Index for Occupant Temp Heat Index
00DD 00A7           00134          movwf   OCTMPHE         ; Index for Occupant Temp Heat Index
                    00135
00DE 3012           00136          movlw   IOCTMPCO        ; Index for Occupant Temp Cool Index
00DF 00A8           00137          movwf   OCTMPCO         ; Index for Occupant Temp Cool Index
                    00138
00E0 3005           00139          movlw   IOWTMPHE        ; Index for Owner Temp Heat Index
00E1 00A9           00140          movwf   OWTMPHE         ; Index for Owner Temp Heat Index
                    00141
00E2 3014           00142          movlw   IOWTMPCO        ; Index for Owner Temp Cool Index

```
MPASM 01.20 Released          MAIN.ASM   8-10-1995  21:07:15      PAGE 17
Dual Level Thermostat Program June, 1995

LOC  OBJECT CODE    LINE SOURCE TEXT
     VALUE

00E3 00AA           00143       movwf   OWTMPCO         ; Index for Owner Temp Cool Index
                    00144
00E4 300B           00145       movlw   IOWTIMOUT       ; Owner Time Out in Minutes
00E5 00AB           00146       movwf   OWTIMOUT        ; Owner Time Out in Minutes
                    00147
00E6 0008           00148       return                  ; Exit subroutine
                    00149
                    00150 ; -------------------------------------------------------------
                    00071 #include adconv.asm
                    00001 ; -------------------------------------------------------------
                    00002
                    00003 ; File Name: ADCONV.ASM       A/D Conversion Routines
                    00004
                    00005 ; -------------------------------------------------------------
                    00006
                    00007 ; Initialize A/D Ports
                    00008
00E7                00009 InitADPort
00E7 1683           00010       bsf     STATUS, 5       ; Select Page 1
00E8 3002           00011       movlw   2               ; Prepare to use RA0 & RA1 as A/D
00E9 0088           00012       movwf   ADCON1          ; Use RA0 & RA1 as A/D
00EA 1283           00013       bcf     STATUS, 5       ; Select Page 0
00EB 0008           00014       return                  ; Return from subroutine
                    00015
                    00016 ; -------------------------------------------------------------
                    00017
                    00018 ; Convert Channel RA0 or RA1.
                    00019 ; On Entry: must have previously executed InitADPort above to
                    00020 ;           initialize the port.
                    00021 ; On Exit: Result stored in register ADRES and A/D power is off.
                    00022
00EC                00023 ConvertCh1
00EC 30C9           00024       movlw   B'11001001'     ; Select Channel RA1, clear ADIF
00ED 28EF           00025       goto    ConvertCh       ; Go continue
00EE                00026 ConvertCh0
00EE 30C1           00027       movlw   B'11000001'     ; Select Channel RA0, clear ADIF
00EF                00028 ConvertCh
00EF 0088           00029       movwf   ADCON0          ; tad = tRC
00F0 1686           00030       bsf     PORT_B, SWPOWER ; Switch Power On
                    00031       ; nop                   ; delay
                    00032       ; nop                   ; delay
                    00033
00F1 1508           00034       bsf     ADCON0, GO      ; Start A/D Conversion
00F2                00035 ConvertWait
00F2 1908           00036       btfsc   ADCON0, DONE    ; See if still busy
00F3 28F2           00037       goto    ConvertWait     ; Loop while busy
00F4 1008           00038       bcf     ADCON0, ADON    ; Turn the A/D power off
00F5 1286           00039       bcf     PORT_B, SWPOWER ; Switch Power Off
00F6 0008           00040       return                  ; Return from subroutine
```

MPASM 01.20 Released           MAIN.ASM   8-10-1995  21:07:15        PAGE 18
Dual Level Thermostat Program June, 1995

LOC  OBJECT CODE    LINE  SOURCE TEXT
    VALUE

```
                    00041
                    00042
                    00043 ; ------------------------------------------------------------
                    00044
                    00045 ; Read & display temperature in right display.
                    00046 ; Executes InitADPort above to initialize the port, Reads AoD Channel 0,
                    00047 ; converts the A/D to index and then to hex and then to segments,
                    00048 ; then displays the data in both LCDs.
                    00049 ; On Entry:
                    00050 ; On Exit: A/D result stored in register ADRES and A/D power is off.
                    00051 ;          LCD3 & LCD4 contain the new segments and TEMP has the A/D.
                    00052 ;          CURINDEX will contain current temperature's index.
                    00053
00F7                00054 ReadDispA2D
                    00055
00F7 20E7           00056         call    InitADPort      ; Initialize A/D
00F8 20EE           00057         call    ConvertCh0      ; Test A/D
                    00058
                    00059         ; ------------------------------------------------------------
                    00060
00F9 0809           00061         movf    ADRES, W        ; Get current A/D
00FA 20A8           00062         call    A2D2Index       ; Convert A/D to Index
00FB 00AE           00063         movwf   CURINDEX        ; Save current temperature's index
00FC 2034           00064         call    Index2Deg       ; Convert Index to Degrees
                    00065
                    00066         ; ------------------------------------------------------------
                    00067
00FD 289D           00068         goto    Hex2SegRight    ; Convert Hex to Segments
                    00069                                 ; return from there
                    00070
                    00071 ; ------------------------------------------------------------
                    00072
                    00072 #include lcd.asm
                    00001 ; ------------------------------------------------------------
                    00002
                    00003 ; File Name: LCD.ASM          LCD ASM File
                    00004
                    00005 ; ------------------------------------------------------------
                    00006
                    00007 ;************************************************************
                    00008 ;          Bit Definitions
                    00009 ;************************************************************
    0002            00010 LDATA   equ     2       ; serial LCD data line (port_b,pin 8)
    0001            00011 LCLK    equ     1       ; serail LCD clock line (port_b,pin 7)
                    00012
                    00013 ;************************************************************
                    00014
                    00015 ; Display Segments on LCD.
                    00016 ; On Entry: LCD1, LCD2, LCD3, LCD4 contain the segment patterns
```

MPASM 01.20 Released            MAIN.ASM   8-10-1995  21:07:15        PAGE 19
Dual Level Thermostat Program June, 1995

LOC  OBJECT CODE    LINE SOURCE TEXT
     VALUE

00017 ;              for the Left thru Right Digits.
                    00018 ;       Uses: TEMP, LOOPS, LOOPS2, FSR, COUNT, BYCNT
                    00019 ;*********************************************************
                    00020
00FE                00021 LcdDisplay
00FE 30C1           00022          movlw    PORTBWT           ; set data,clock as outputs
00FF 0066           00023          tris     PORT_B
                    00024
0100 300D           00025          movlw    LCD1              ; Point to the
0101 0084           00026          movwf    FSR               ; first LCD Segments
                    00027
0102 3004           00028          movlw    .4
0103 0093           00029          movwf    BYCNT             ; Load byte counter
                    00030
0104                00031 Lcd_10  ; Digit Loop
0104 3008           00032          movlw    .8
0105 0098           00033          movwf    COUNT             ; set the #bits to 8
                    00034
                    00035
0106 0800           00036          movf     IND0, W           ; Get current Digit
0107 008C           00037          movwf    TEMP              ; Load Segments
                    00038
0108                00039 Lcd_20  ; Bit Loop
0108 1506           00040          bsf      PORT_B, LDATA     ; set high in case is 1
0109 0D8C           00041          rlf      TEMP, 1           ; rotate TEMP (Segments) 1 bit left
010A 1C03           00042          btfss    STATUS, CARRY     ; Skip if carry is 1
010B 1106           00043          bcf      PORT_B, LDATA     ; Set low
                    00044
010C 1486           00045          bsf      PORT_B, LCLK      ; set clock high
010D 1086           00046          bcf      PORT_B, LCLK      ; set clock low
                    00047
                    00048
                    00049          ; Bit Loop:
010E 0B98           00050          decfsz   COUNT, 1          ; Decrement Segment counter
010F 2908           00051          goto     Lcd_20            ; Do Segment Loop
                    00052
                    00053
                    00054          ; Digit Loop:
0110 0A84           00055          incf     FSR, 1            ; Point to next LCD Segments
0111 0B93           00056          decfsz   BYCNT, 1          ; Decrement byte counter
0112 2904           00057          goto     Lcd_10            ; Do Digit Loop
                    00058
0113 30C5           00059          movlw    PORTBRD           ; make SDATA an input line
0114 0066           00060          tris     PORT_B
                    00061
0115 0008           00062          return                     ; Exit subroutine
                    00063
                    00064 ; ---------------------------------------------------------------
                    00065
```

```
MPASM 01.20 Released           MAIN.ASM    8-10-1995  21:07:15          PAGE 20
Dual Level Thermostat Program June, 1995

LOC  OBJECT CODE     LINE  SOURCE TEXT
     VALUE

00073 #include switches.asm
                     00001 ; ----------------------------------------------------------------
                     00002
                     00003 ; File Name: SWITCHES.ASM         Switches ASM File
                     00004
                     00005 ; ----------------------------------------------------------------
                     00006
                     00007 ; Read Port A and Port B and saves them in SAVESWA and SAVESWB.
                     00008 ; On Exit: Result stored in SAVESWA and SAVESWB
                     00009 ;          and A/D power is off.
                     00010
0116                 00011 ReadSwitches
0116 1686            00012         bsf     PORT_B, SWPOWER     ; Switch Power On
0117 0000            00013         nop                         ; Delay required
0118 0000            00014         nop                         ; Delay required
0119 0000            00015         nop                         ; Delay required
011A 0000            00016         nop                         ; Delay required
011B 0000            00017         nop                         ; Delay required
011C 0000            00018         nop                         ; Delay required
                     00019
011D 0805            00020         movf    PORT_A, W           ; Get Port A
011E 00A5            00021         movwf   SAVSWA              ; Saved Switches A
                     00022
011F 0806            00023         movf    PORT_B, W           ; Get Port B
                     00024
0120 1286            00025         bcf     PORT_B, SWPOWER     ; Switch Power Off
                     00026
0121 00A6            00027         movwf   SAVSWB              ; Saved Switches B
                     00028
0122 0008            00029         return                      ; Return from subroutine
                     00030
                     00031 ; ----------------------------------------------------------------
                     00032
                     00033 ; Check keys in SAVESWA
                     00034 ; Return STATUS,Z = 0 if any programming key pressed,
                     00035 ;        STATUS,Z = 1 if no key pressed:
                     00036
0123                 00037 PgmKeyOn
0123 0825            00038         movfw   SAVSWA              ; Look at A Bank
0124 391C            00039         andlw   AKEYSMASK           ; Mask the keys
0125 3A1C            00040         xorlw   AKEYSMASK           ; Mask the keys
                     00041
0126 0008            00042         return                      ; Indicate a key pressed, Z=0 OR
                     00043                                     ; Indicate NO key pressed, Z=1
                     00044
                     00045 ; ----------------------------------------------------------------
                     00046
                     00047 ; Check keys in SAVESWB
                     00048 ; Return STATUS,Z = 0 if any heat/cool key pressed,
```

```
MPASM 01.20 Released           MAIN.ASM   8-10-1995 21:07:15        PAGE 21
Dual Level Thermostat Program June, 1995

LOC  OBJECT CODE    LINE SOURCE TEXT
     VALUE

00049 ;      STATUS,Z = 1 if no key pressed:
                    00050
0127                00051 HeatCoolKeyOn
0127 0826           00052         movfw    SAVSWB          ; Look at B Bank
0128 39C0           00053         andlw    BKEYSMASK       ; Mask the keys
0129 3AC0           00054         xorlw    BKEYSMASK       ; Mask the keys
                    00055
012A 0008           00056         return                   ; Indicate a key pressed, Z=0 OR
                    00057                                  ; Indicate NO key pressed, Z=1
                    00058
                    00059 ; ----------------------------------------------------------------
                    00074 #include setvals.asm
                    00001 ; ----------------------------------------------------------------
                    00002
                    00003 ; File Name: SETVALS.ASM         Set  ASM File
                    00004
                    00005 ; ----------------------------------------------------------------
                    00006
                    00007 ; Determine which kind of information needs to be modified.
                    00008 ; Return: Pointer to index to be modified is in W:
                    00009 ;         one of: OCTMPHE, OCTMPCO, OWTMPHE, OWTMPCO, OWTIMOUT,
                    00010 ;                 or 0x00 if none are to be modified.
                    00011 ;         MAXINDEX contains the ,aximum index for value being set.
                    00012 ;         LCD3 contains LCD Segment Data 3rd Digit and
                    00013 ;         LCD4 contains LCD Segment Data 4th Digit
                    00014 ;              but display is not updated.
                    00015 ;
                    00016
012B                00017 Which2Mod
012B 301D           00018         movlw    MAXTMPINDEX     ; Load the max index for temps
012C 00AC           00019         movwf    MAXINDEX        ; Maximum index for value being set
                    00020
012D 3001           00021         movlw    MINTMPINDEX     ; Load the min index for temps
012E 00AD           00022         movwf    MININDEX        ; Minimum index for value being set
                    00023
                    00024 ; ----------------------------------------------------------------
                    00025
                    00026         ; Clear the Temp measure timer
                    00027
                    00028 ; ----------------------------------------------------------------
                    00029
                    00030         ; Set Right Display to "-":
012F 3040           00031         movlw    DISPTADJ        ; Display pattern for temp adjust "-"
0130 008F           00032         movwf    LCD3            ; LCD Segment Data 3rd Digit
0131 0090           00033         movwf    LCD4            ; LCD Segment Data 4th Digit
                    00034
                    00035 ; ----------------------------------------------------------------
                    00036
                    00037         ; See whether Owner or Occupant Key Switch Mode:
```

MPASM 01.20 Released          MAIN.ASM    8-10-1995  21:07:15       PAGE 22
Dual Level Thermostat Program June, 1995

LOC  OBJECT CODE    LINE  SOURCE TEXT
     VALUE 0132 1A25           00038        btfsc   SAVSWA, SWAKEY  ; Check Key Switch, skip if on
0133 2941           00039        goto    KeySwNotOn      ; Branch if key switch not on (Occupant)
                    00040
                    00041   ; ---------------------------------------------------------------
                    00042   ; Owner Temperature Adjustments:
                    00043
0134 21E0           00044        call    TurnOffPower    ; Turn off Power
                    00045
0135 1F26           00046        btfss   SAVSWB, SWBHEAT ; Check Heat Switch, skip if off
0136 3429           00047        retlw   OWTMPHE         ; Return Pointer to Owner Temp Heat Index
                    00048
0137 1FA6           00049        btfss   SAVSWB, SWBCOOL ; Check Cool Switch, skip if off
0138 342A           00050        retlw   OWTMPCO         ; Return Pointer to Owner Temp Cool Index
                    00051
                    00052   ; ---------------------------------------------------------------
                    00053   ; Owner Timer Adjustments:
                    00054
0139 3013           00055        movlw   MAXTIMINDEX     ; Max index for timer values
013A 00AC           00056        movwf   MAXINDEX        ; Maximum index for value being set
                    00057
013B 3000           00058        movlw   MINTIMINDEX     ; Min index for timer values
013C 00AD           00059        movwf   MININDEX        ; Minimum index for value being set
                    00060
013D 3036           00061        movlw   DISPCADJ        ; Display pattern for time (clock) adjust
"||"
013E 008F           00062        movwf   LCD3            ; LCD Segment Data 3rd Digit
013F 0090           00063        movwf   LCD4            ; LCD Segment Data 4th Digit
                    00064
0140 342B           00065        retlw   OWTIMOUT        ; Return Pointer to Owner Time Out Index
                    00066
                    00067   ; ---------------------------------------------------------------
                    00068   ; Occupant Adjustments:
0141                00069  KeySwNotOn
                    00070
0141 1F26           00071        btfss   SAVSWB, SWBHEAT ; Check Heat Switch, skip if off
0142 3427           00072        retlw   OCTMPHE         ; Return Pointer to Occupant Temp Heat Index
                    00073
0143 1FA6           00074        btfss   SAVSWB, SWBCOOL ; Check Cool Switch, skip if off
0144 3428           00075        retlw   OCTMPCO         ; Return Pointer to Occupant Temp Cool Index
                    00076
0145 3036           00077        movlw   DISPCADJ        ; Display pattern for time (clock) adjust
"||"
0146 008D           00078        movwf   LCD1            ; LCD Segment Data 1st Digit
0147 008E           00079        movwf   LCD2            ; LCD Segment Data 2nd Digit
0148 3400           00080        retlw   0x00            ; Return Zero for nothing to adjust
                    00081
                    00082   ; ---------------------------------------------------------------
                    00083
0149 0008           00084        return                  ; Exit subroutine
                    00085
                    00086   ; ---------------------------------------------------------------
```

```
MPASM 01.20 Released           MAIN.ASM  8-10-1995 21:07:15      PAGE 23
Dual Level Thermostat Program June, 1995

LOC  OBJECT CODE    LINE SOURCE TEXT
     VALUE 00087
                    00088 ; Process the switch inputs and modify indexes, etc.
014A                00089 ProcessKeys
                    00090
014A 3078           00091        movlw   A2DTMRSET      ; Load timer value
014B 009C           00092        movwf   A2DTMR         ; Into the timer counter
                    00093
014C 14A3           00094        bsf     FLAGS, 1       ; Make the Switch Flag = 1
                    00095
014D 212B           00096        call    Which2Mod      ; Determine which kind to be modified
014E 0084           00097        movwf   FSR            ; Set our pointer to index
                    00098
014F 0884           00099        movf    FSR, 1         ; Test for Zero returned
0150 1903           00100        btfsc   STATUS, Z      ; Check for Zero
0151 296C           00101        goto    ProcessDisp    ; Quit if Zero
                    00102
                    00103        ; ----------------------------------------------------------
                    00104
0152 1925           00105        btfsc   SAVSWA, SWAINC ; Check Increase Switch
0153 295A           00106        goto    ProcessDec     ; Go check for Decrease Switch
                    00107
0154                00108 ProcessInc
0154 0800           00109        movf    INDF, W        ; Check for
0155 02AC           00110        subwf   MAXINDEX, 1    ; Already at max index
                    00111
0156 1903           00112        btfsc   STATUS, Z      ; Check for Zero
0157 2962           00113        goto    ProcessNew     ; Go display if max
                    00114
0158 0A80           00115        incf    INDF, 1        ; Increment the index
0159 2962           00116        goto    ProcessNew     ; Go display
                    00117
015A                00118 ProcessDec
015A 19A5           00119        btfsc   SAVSWA, SWADEC ; Check Decrease Switch
015B 2962           00120        goto    ProcessNew     ; Go display if no switch
                    00121
015C 0800           00122        movf    INDF, W        ; Check for
015D 02AD           00123        subwf   MININDEX, 1    ; Already at min index
                    00124
015E 1903           00125        btfsc   STATUS, Z      ; Check for Zero
015F 2962           00126        goto    ProcessNew     ; Go display if max
                    00127
0160 0380           00128        decf    INDF, 1        ; Decrement the index
0161 2962           00129        goto    ProcessNew     ; Go display if max
                    00130
                    00131        ; ----------------------------------------------------------
                    00132
0162                00133 ProcessNew
0162 0804           00134        movfw   FSR            ; What kind of index?
0163 3C2B           00135        sublw   OWTIMOUT       ; Is the Timer?
```

```
MPASM 01.20 Released              MAIN.ASM    8-10-1995  21:07:15        PAGE 24
Dual Level Thermostat Program June, 1995

LOC  OBJECT CODE     LINE SOURCE TEXT
     VALUE 0164 1D03            00136          btfss   STATUS, Z       ; Check for Zero
0165 2969            00137          goto    ProcessTemp     ; Go process temperature display
                     00138
                     00139    ; ------------------------------------------------------------
                     00140
0166                 00141 ProcessTimer
0166 0800            00142          movfw   INDF            ; What kind of index?
0167 206A            00143          call    Index2DispMin   ; Convert Index to Degrees
0168 296B            00144          goto    ProcessBoth     ; Go process the display
                     00145
                     00146    ; ------------------------------------------------------------
                     00147
0169                 00148 ProcessTemp
0169 0800            00149          movfw   INDF            ; What kind of index?
016A 2034            00150          call    Index2Deg       ; Convert Index to Degrees
                     00151
                     00152    ; ------------------------------------------------------------
                     00153
016B                 00154 ProcessBoth
016B 2096            00155          call    Hex2SegLeft     ; Display the Hex
                     00156
                     00157    ; ------------------------------------------------------------
                     00158
016C                 00159 ProcessDisp
016C 20FE            00160          call    LcdDisplay      ; display the data
                     00161
                     00162        ; Modify saved heat/cool switch settings:
016D 0826            00163          movfw   SAVSWB          ; Get Saved Switches B
016E 3AC0            00164          xorlw   HTORCOL         ; Flip heat and cool switches only
016F 009F            00165          movwf   SAVDHTCO        ; Save Modified Last setting of Switches B
                     00166
0170 0008            00167          return                  ; Exit subroutine
                     00168
                     00169 ; ------------------------------------------------------------
                     00170
                     00075 #include control.asm
                     00001 ; ------------------------------------------------------------
                     00002
                     00003 ; File Name: CONTROL.ASM          Control ASM File
                     00004
                     00005 ; ------------------------------------------------------------
                     00006
                     00007 ; Main control function called whenever the A/D timer times out.
0171                 00008 Control
0171 2116            00009          call    ReadSwitches    ; Read and save switches
                     00010
0172 2123            00011          call    PgmKeyOn        ; Check for program switches on
0173 1D03            00012          btfss   STATUS, Z       ; Check for Zero flag True - No Keys
0174 294A            00013          goto    ProcessKeys     ; Go Process keys and return from there
```

```
MPASM 01.20 Released              MAIN.ASM   8-10-1995  21:07:15        PAGE 25
Dual Level Thermostat Program June, 1995

LOC  OBJECT CODE    LINE  SOURCE TEXT
     VALUE 00014
                    00015   ; ------------------------------------------------------------
                    00016
                    00017 ; Temperature Control Section:
                    00018
0175 21ED           00019         call    WorkCompTimer   ; Work the Compressor Restart Timer
                    00020
                    00021         ; Work the A/D Sample Timer (for 1 minute)
0176 089C           00022         movf    A2DTMR, 1       ; Test for Zero
0177 1D03           00023         btfss   STATUS, Z       ; Skip if Zero
0178 039C           00024         decf    A2DTMR, 1       ; Work the A/D timer
                    00025
0179 1903           00026         btfsc   STATUS, Z       ; Skip if Zero
017A 2981           00027         goto    DoControl       ; Go Save EEprom
                    00028
                    00029         ; Check for heat/cool switch change:
017B 0826           00030         movfw   SAVSWB          ; Get Saved Switches B
017C 061F           00031         xorwf   SAVDHTCO, 0     ; Compare Last setting of Switches B
017D 39C0           00032         andlw   HTORCOL         ; Look at heat and cool switches only
                    00033
017E 1903           00034         btfsc   STATUS, Z       ; Check for Zero flag True - No Sw Change
017F 29CE           00035         goto    RefreshLCD      ; Go refresh LCD Display
0180 2985           00036         goto    ReloadTimoutTimer ; Go Reload the timeout timer
                    00037
                    00038   ; ------------------------------------------------------------
                    00039
0181                00040 DoControl
                    00041         ; A2DTMR Sample Timer - Zero means time to do some kind of control:
                    00042
0181 1CA3           00043         btfss   FLAGS, 1        ; See if the settings have changed
0182 2986           00044         goto    ControlTemp     ; Go just control temperature
                    00045
                    00046         ; Save the new settings to EEProm
0183 10A3           00047         bcf     FLAGS, 1        ; Clear the switch flag
                    00048 ifdef UseEEPROM
0184 227F           00049         call    SaveEeprom      ; Save the CPU Ram values to EEPPROM
                    00050 endif
                    00051
0185                00052 ReloadTimoutTimer
                    00053
                    00054         ; Reload the Timeout Timer:
0185 20D6           00055         call    LoadTimeout     ; Load timeout minutes into TIMEOUT.
                    00056
                    00057   ; ------------------------------------------------------------
                    00058
0186                00059 ControlTemp
                    00060
0186 0826           00061         movfw   SAVSWB          ; Get Saved Switches B
0187 009F           00062         movwf   SAVDHTCO        ; Save Last setting of Switches B
```

```
MPASM 01.20 Released            MAIN.ASM  8-10-1995  21:07:15       PAGE 26
Dual Level Thermostat Program June, 1995

LOC  OBJECT CODE    LINE SOURCE TEXT
     VALUE 00063
                    00064         ; Adjust the Owner (=0)/Occupant (=1) Operation Flag
0188 1423           00065         bsf     FLAGS, 0        ; Set Owner/OCCUPANT Operation Flag
0189 08A2           00066         movf    TIMEOUT, 1      ; Test for Zero
018A 1903           00067         btfsc   STATUS, Z       ; Skip if NOT Zero
018B 1023           00068         bcf     FLAGS, 0        ; Clear OWNER/Occupant Operation Flag
                    00069
                    00070         ; Work the Binary Occupant Time Out Timer every 1 minute:
018C 08A2           00071         movf    TIMEOUT, 1      ; Test for Zero
018D 1D03           00072         btfss   STATUS, Z       ; Skip if Zero
018E 03A2           00073         decf    TIMEOUT, 1      ; Work the Time Out Timer
                    00074
                    00075         ; ---------------------------------------------------------------
018F 3078           00076         movlw   A2DTMRSET       ; Load timer value
0190 009C           00077         movwf   A2DTMR          ; Into the timer counter
                    00078
0191 20F7           00079         call    ReadDispA2D     ; Read & display temperature in right display
                    00080
                    00081         ; ---------------------------------------------------------------
                    00082
0192 1F26           00083         btfss   SAVSWB, SWBHEAT ; Look at B Bank, Heat Switch
0193 299B           00084         goto    ControlHeat     ; Go control heating
                    00085
0194 1FA6           00086         btfss   SAVSWB, SWBCOOL ; Look at B Bank, Cool Switch
0195 29AF           00087         goto    ControlCool     ; Go control cooling
                    00088
                    00089         ; No Heating or Cooling Control Requested:
                    00090         ; Set Left Display to "-":
0196 3040           00091         movlw   DISPTADJ        ; Display pattern for temp adjust "-"
0197 008D           00092         movwf   LCD1            ; LCD Segment Data 1st Digit
0198 008E           00093         movwf   LCD2            ; LCD Segment Data 2nd Digit
0199 1206           00094         bcf     PORT_B, POWERON ; Bit on B Bank to turn off Power (Off=0)
019A 29C3           00095         goto    ControlLast     ; Go display the data
                    00096
019B                00097 ControlHeat
                    00098
                    00099         ; Check the Owner (=0)/Occupant (=1) Operation Flag
019B 0827           00100         movfw   OCTMPHE         ; Index for Occupant Temp Heat Index
019C 1C23           00101         btfss   FLAGS, 0        ; Check Owner/OCCUPANT Operation Flag
019D 0829           00102         movfw   OWTMPHE         ; Index for Owner Temp Heat Index
019E 00AF           00103         movwf   WKGINDEX        ; Save working Heat/Cool-Occupant/Owner Index
                    00104
019F 082F           00105         movfw   WKGINDEX        ; Working Heat/Cool-Occupant/Owner Index
01A0 2034           00106         call    Index2Deg       ; Convert Index to Degrees
01A1 2096           00107         call    Hex2SegLeft     ; Display the Hex
                    00108
                    00109         ; Insert Heating Control functions here:
                    00110
01A2 30FF           00111         movlw   -1              ; Prepare for power being on
```

MPASM 01.20 Released        MAIN.ASM   8-10-1995  21:07:15     PAGE 27
Dual Level Thermostat Program June, 1995

LOC  OBJECT CODE     LINE SOURCE TEXT
     VALUE

01A3 1E06             00112        btfss   PORT_B, POWERON ; Bit on B Bank to turn On Power (On=1)
01A4 3001             00113        movlw   1               ; Prepare for power being off
01A5 07AE             00114        addwf   CURINDEX, 1     ; Add the signed hysteresis
                      00115
01A6 082F             00116        movfw   WKGINDEX        ; Working Heat/Cool-Occupant/Owner Index
01A7 022E             00117        subwf   CURINDEX, W     ; Current Temperature Index
01A8 1C03             00118        btfss   STATUS, C       ; Skip if Positive
01A9 21E6             00119        call    TurnOnPower     ; Turn on Power
                      00120
01AA 082E             00121        movfw   CURINDEX        ; Current Temperature Index
01AB 022F             00122        subwf   WKGINDEX, W     ; Working Heat/Cool-Occupant/Owner Index
01AC 1C03             00123        btfss   STATUS, C       ; Skip if Positive
01AD 21E0             00124        call    TurnOffPower    ; Turn off Power
                      00125
01AE 29C3             00126        goto    ControlLast     ; Go display the data
                      00127
01AF                  00128 ControlCool
                      00129        ; Check the Owner (=0)/Occupant (=1) Operation Flag
01AF 0828             00130        movfw   OCTMPCO         ; Index for Occupant Temp Heat Index
01B0 1C23             00131        btfss   FLAGS, 0        ; Check Owner/OCCUPANT Operation Flag
01B1 082A             00132        movfw   OWTMPCO         ; Index for Owner Temp Heat Index
01B2 00AF             00133        movwf   WKGINDEX        ; Save working Heat/Cool-Occupant/Owner Index
                      00134
01B3 082F             00135        movfw   WKGINDEX        ; Working Heat/Cool-Occupant/Owner Index
01B4 2034             00136        call    Index2Deg       ; Convert Index to Degrees
01B5 2096             00137        call    Hex2SegLeft     ; Display the Hex
                      00138
                      00139        ; Insert Cooling Control functions here:
                      00140
01B6 3001             00141        movlw   1               ; Prepare for power being on
01B7 1E06             00142        btfss   PORT_B, POWERON ; Bit on B Bank to turn On Power (On=1)
01B8 30FF             00143        movlw   -1              ; Prepare for power being off
01B9 07AE             00144        addwf   CURINDEX, 1     ; Add the signed hysteresis
                      00145
01BA 082F             00146        movfw   WKGINDEX        ; Working Heat/Cool-Occupant/Owner Index
01BB 022E             00147        subwf   CURINDEX, W     ; Current Temperature Index
01BC 1C03             00148        btfss   STATUS, C       ; Skip if Positive
01BD 21E0             00149        call    TurnOffPower    ; Turn off Power
                      00150
01BE 082E             00151        movfw   CURINDEX        ; Current Temperature Index
01BF 022F             00152        subwf   WKGINDEX, W     ; Working Heat/Cool-Occupant/Owner Index
01C0 1C03             00153        btfss   STATUS, C       ; Skip if Positive
01C1 21E6             00154        call    TurnOnPower     ; Turn on Power
                      00155
01C2 29C3             00156        goto    ControlLast     ; Go display the data
                      00157
01C3                  00158 ControlLast
                      00159
01C3 080D             00160        movfw   LCD1            ; Get LCD1

MPASM 01.20 Released          MAIN.ASM   8-10-1995  21:07:15        PAGE 28
Dual Level Thermostat Program June, 1995

LOC  OBJECT CODE    LINE SOURCE TEXT
    VALUE

01C4 00A0           00161       movwf   SAVLCD1         ; Save in SAVLCD1
01C5 080E           00162       movfw   LCD2            ; Get LCD2
01C6 00A1           00163       movwf   SAVLCD2         ; Save in SAVLCD2
                    00164
01C7 1123           00165       bcf     FLAGS, 2        ; Clear Lo Battery flag in case OK
                    00166
01C8 20EC           00167       call    ConvertCh1      ; Read the Battery on Channel 1
01C9 0809           00168       movfw   ADRES           ; Get the A/D reading
01CA 3C71           00169       sublw   LOBATCNTS       ; Check for Low Battery Level
01CB 1C03           00170       btfss   STATUS, C       ; Skip if Negative
01CC 29DC           00171       goto    ControlDisp     ; Go display data only, Battery OK
                    00172
                    00173       ; Indicate that Battery is low:
01CD 1523           00174       bsf     FLAGS, 2        ; Set Lo Battery flag
                    00175
01CE                00176 RefreshLCD
                    00177
                    00178       ; Restore Left LCD Data:
01CE 0820           00179       movfw   SAVLCD1         ; Get SAVLCD1
01CF 008D           00180       movwf   LCD1            ; Save in LCD1
01D0 0821           00181       movfw   SAVLCD2         ; Get SAVLCD2
01D1 008E           00182       movwf   LCD2            ; Save in LCD2
                    00183
01D2 1D23           00184       btfss   FLAGS, 2        ; Check Lo Battery Flag
01D3 29DC           00185       goto    ControlDisp     ; Battery OK, go display normal
                    00186
01D4 1FA3           00187       btfss   FLAGS, 7        ; Test Timer
01D5 29DA           00188       goto    NoShowLB        ; Don't show the "Lb" in left display
                    00189
                    00190       ; Show 'Lb' in left display:
01D6 3038           00191       movlw   LCD_LTR_L       ; Load letter 'L'
01D7 008D           00192       movwf   LCD1            ; Save the digit
                    00193
01D8 307C           00194       movlw   LCD_LTR_b       ; Load letter 'b'
01D9 008E           00195       movwf   LCD2            ; Save the digit
                    00196
01DA                00197 NoShowLB
01DA 178D           00198       bsf     LCD1,7          ; Or DP into the digit
01DB 178E           00199       bsf     LCD2,7          ; Or DP into the digit
                    00200
01DC                00201 ControlDisp
                    00202
                    00203       ; Check the Owner (=0)/Occupant (=1) Operation Flag
01DC 1823           00204       btfsc   FLAGS, 0        ; Check Owner/OCCUPANT Operation Flag
01DD 1790           00205       bsf     LCD4,7          ; Or DP into the digit if Occupant
                    00206
01DE 20FE           00207       call    LcdDisplay      ; display the data
01DF 0008           00208       return                  ; Exit subroutine
                    00209
```

```
MPASM 01.20 Released              MAIN.ASM    8-10-1995  21:07:15      PAGE 29
Dual Level Thermostat Program June, 1995

LOC  OBJECT CODE    LINE SOURCE TEXT
     VALUE

00210 ; ----------------------------------------------------------------
                    00076 #include comptimr.asm
                    00001 ; ----------------------------------------------------------------
                    00002
                    00003 ; File Name: COMPTIMR.ASM         Compressor Timer ASM File
                    00004
                    00005 ; ----------------------------------------------------------------
                    00006
                    00007 ; COMPTIMRL      ; Compressor Restart Timer Low Half
                    00008 ; COMPTIMRH      ; Compressor Restart Timer High Half
                    00009
                    00010 ; ----------------------------------------------------------------
                    00011
                    00012 ; Turn off power and reload the Compressor Restart Timer:
01E0                00013 TurnOffPower
01E0 1206           00014        bcf     PORT_B, POWERON      ; Bit to turn Off Power (Off=0)
                    00015
01E1 3068           00016        movlw   LOW COMPTMRSET       ; Load Compressor time out value
01E2 009D           00017        movwf   COMPTIMRL            ; Into Compressor Restart Timer Lo
                    00018
01E3 3002           00019        movlw   HIGH COMPTMRSET      ; Load Compressor time out value
01E4 009E           00020        movwf   COMPTIMRH            ; Into Compressor Restart Timer Hi
                    00021
01E5 0008           00022        return                       ; Return from Subroutine
                    00023
                    00024 ; ----------------------------------------------------------------
                    00025
                    00026 ; Turn on power if the Compressor Restart Timer is timed out:
01E6                00027 TurnOnPower
01E6 1BA6           00028        btfsc   SAVSWB, SWBCOOL      ; Look at B Bank, Cool Switch
01E7 29EB           00029        goto    TurnOnPower1         ; Go control power
                    00030
01E8 089E           00031        movf    COMPTIMRH, 1         ; Test Compressor Restart Timer Hi
01E9 1D03           00032        btfss   STATUS, Z            ; Skip if Zero
01EA 29EC           00033        goto    TurnOnPower2         ; Go skip control power
                    00034
01EB                00035 TurnOnPower1
01EB 1606           00036        bsf     PORT_B, POWERON      ; Bit to turn On Power (On=1)
                    00037
01EC                00038 TurnOnPower2
01EC 0008           00039        return                       ; Return from Subroutine
                    00040
                    00041 ; ----------------------------------------------------------------
                    00042
                    00043 ; Work the Compressor Restart Timer if not zero:
01ED                00044 WorkCompTimer
01ED 089E           00045        movf    COMPTIMRH, 1         ; Test Compressor Restart Timer Hi
01EE 1903           00046        btfsc   STATUS, Z            ; Skip if Not Zero
01EF 0008           00047        return                       ; Return from Subroutine
```

MPASM 01.20 Released          MAIN.ASM   8-10-1995  21:07:15      PAGE 30
Dual Level Thermostat Program June, 1995

LOC   OBJECT CODE    LINE SOURCE TEXT
      VALUE 00048
01F0  0B9D           00049          decfsz  COMPTIMRL, 1            ; Work Compressor Restart Timer Lo
01F1  0008           00050          return                          ; Return from Subroutine
01F2  039E           00051          decf    COMPTIMRH, 1            ; Work Compressor Restart Timer Hi
                     00052
01F3  0008           00053          return                          ; Return from Subroutine
                     00054
                     00055 ; ---------------------------------------------------------------
                     00056
                     00077
                     00078  ifdef UseEEPROM
                     00079 #include eeprom.asm
                     00001 ; ---------------------------------------------------------------
                     00002
                     00003 ; File Name: EEPROM.ASM          EEPROM Read & write routines
                     00004
                     00005 ; ---------------------------------------------------------------
                     00006
                     00007
                     00008 ;*********************************************************
                     00009 ;      2-Wire Byte Read/Write Program
                     00010 ;
                     00011 ;      This program interfaces a Microchip PIC 16c71 to a
                     00012 ;      24LCXX Serial EE device.
                     00013 ;
                     00014 ;      This routine waits approximately 10mS for the write
                     00015 ;      cycle time, which is enough time for any of the
                     00016 ;      24LCxx devices to complete a write.
                     00017 ;
                     00018 ;      Timing is based on using the PIC at 32 kHz.
                     00019 ;
                     00020 ;      PIC to Serial EE Connections:
                     00021 ;
                     00022 ;         PIC            Serial EE
                     00023 ;      -----------      -----------
                     00024 ;      Pin 8 (RB2) -->    SDATA
                     00025 ;      Pin 9 (RB3) -->    SCLK
                     00026 ;
                     00027 ;
                     00028 ;*********************************************************
                     00029 ;           Register Definitions
                     00030 ;*********************************************************
                     00031 ; STATUS   equ     3h       ; status register
                     00032 ; PORT_A   equ     5h       ; port 5 (port_a) used for LEDs
                     00033 ; PORT_B   equ     6h       ; port 6 (port_b) used for data and
                     00034                             ; clock lines
                     00035
                     00036 ; ES       equ     0x??     ; First Scratch Ram Address
                     00037 ; EEPROM   equ     ES+0     ; bit buffer

```
MPASM 01.20 Released            MAIN.ASM   8-10-1995  21:07:15        PAGE 31
Dual Level Thermostat Program June, 1995

LOC  OBJECT CODE    LINE SOURCE TEXT
     VALUE

00038 ; BYCNT    equ    ES+1      ; byte counter for read mode
                    00039 ; ADDR     equ    ES+2      ; address counter
                    00040 ; DATAI    equ    ES+3      ; data input register
                    00041 ; DATAO    equ    ES+4      ; data output register
                    00042 ; TXBUF    equ    ES+5      ; transmit buffer
                    00043 ; COUNT    equ    ES+6      ; bit counter
                    00044 ; BCOUNT   equ    ES+7      ; byte counter
                    00045 ; LOOPS    equ    ES+8      ; delay loop counter
                    00046 ; LOOPS2   equ    ES+9      ; delay loop counter
                    00047
                    00048 ;****************************************************
                    00049 ;         Bit Definitions
                    00050 ;****************************************************
  0007              00051 DI        equ    7          ; eeprom input bit
  0006              00052 DO        equ    6          ; eeprom output bit
  0002              00053 SDATA     equ    2          ; serial EE data line (port_b,pin 8)
  0003              00054 SCLK      equ    3          ; serail EE clock line (port_b,pin 9)
                    00055
                    00056 ;****************************************************
                    00057 ;         Port B Direction Definitions
                    00058 ;****************************************************
                    00059
                    00060 ; PORTBRD equ b'11000101' ; Port B Read SDATA   b'xxxxx01x'
                    00061 ; PORTBWT equ b'11000001' ; Port B Write SDATA  b'xxxxx00x'
                    00062
                    00063 ;****************************************************
                    00064 ;
                    00065 ;         DELAY ROUTINE
                    00066 ;         This routine uses LOOPS for storage of
                    00067 ;         multiplier. It times 10 milliseconds to
                    00068 ;         of delay time.
                    00069 ;         This one is set for 32 kHz CPU Oscillator
                    00070 ;         Uses: LOOPS & LOOPS2
                    00071 ;****************************************************
                    00072
  01F4              00073 Wait
  01F4 300A         00074          movlw   .10
  01F5 009A         00075          movwf   LOOPS            ; set delay time to give
                    00076
  01F6 3004         00077 Top      movlw   4                ; timing adjustment variable
  01F7 009B         00078          movwf   LOOPS2
  01F8 0000         00079 Top2     nop                      ; sit and wait
  01F9 0B9B         00080          decfsz  LOOPS2, 1        ; inner loops complete?
  01FA 29F8         00081          goto    Top2             ; no, go again
                    00082                                   ;
  01FB 0B9A         00083          decfsz  LOOPS, 1         ; outer loops complete?
  01FC 29F6         00084          goto    Top              ; no, go again
  01FD 0008         00085          return                   ; Exit subroutine
                    00086
```

MPASM 01.20 Released          MAIN.ASM   8-10-1995  21:07:15      PAGE 32
Dual Level Thermostat Program June, 1995

LOC  OBJECT CODE    LINE SOURCE TEXT
     VALUE

```
                    00087 ;***************************************************
                    00088 ;    Start Bit Subroutine
                    00089 ;    this routine generates a start bit
                    00090 ;    (Low going data line while clock is high)
                    00091 ;***************************************************
                    00092
01FE                00093 BStart
01FE 1506           00094        bsf     PORT_B,SDATA    ; make sure data is high
01FF 30C1           00095        movlw   PORTBWT
0200 0066           00096        tris    PORT_B          ; set data and clock lines for output
0201 1186           00097        bcf     PORT_B,SCLK     ; make sure clock is low
0202 0000           00098        nop
0203 1586           00099        bsf     PORT_B,SCLK     ; set clock high
0204 0000           00100        nop
0205 0000           00101        nop
0206 0000           00102        nop
0207 0000           00103        nop
0208 0000           00104        nop
0209 1106           00105        bcf     PORT_B,SDATA    ; data line goes low during
                    00106                                ; high clock for start bit
020A 0000           00107        nop
020B 0000           00108        nop
020C 0000           00109        nop
020D 0000           00110        nop
020E 0000           00111        nop                     ; timing adjustment
020F 1186           00112        bcf     PORT_B,SCLK     ; start clock train
0210 0000           00113        nop
0211 0000           00114        nop
0212 0008           00115        return                  ; Exit subroutine
                    00116
                    00117 ;***************************************************
                    00118 ;    Stop Bit Subroutine
                    00119 ;    This routine generates a stop bit
                    00120 ;    (High going data line while clock is high)
                    00121 ;***************************************************
                    00122
0213                00123 BStop
0213 30C1           00124        movlw   PORTBWT         ;
0214 0066           00125        tris    PORT_B          ; set data/clock lines as outputs
0215 1106           00126        bcf     PORT_B,SDATA    ; make sure data line is low
0216 0000           00127        nop
0217 0000           00128        nop
0218 0000           00129        nop
0219 1586           00130        bsf     PORT_B,SCLK     ; set clock high
021A 0000           00131        nop
021B 0000           00132        nop
021C 0000           00133        nop
021D 1506           00134        bsf     PORT_B,SDATA    ; data goes high while clock high
                    00135                                ; for stop bit
```

MPASM 01.20 Released          MAIN.ASM   8-10-1995  21:07:15        PAGE 33
Dual Level Thermostat Program June, 1995

LOC  OBJECT CODE    LINE SOURCE TEXT
     VALUE 021E 0000           00136         nop
021F 0000           00137         nop
0220 1186           00138         bcf     PORT_B,SCLK     ; set clock low again
0221 0000           00139         nop
0222 0000           00140         nop
0223 0000           00141         nop
0224 0008           00142         return                  ; Exit subroutine
                    00143
                    00144 ;*****************************************************
                    00145 ;     BITOUT routine takes one bit of data in 'do' and
                    00146 ;     transmits it to the serial EE device
                    00147 ;*****************************************************
                    00148
0225                00149 BitOut
0225 30C1           00150         movlw   PORTBWT         ; set data,clock as outputs
0226 0066           00151         tris    PORT_B
0227 1F12           00152         btfss   EEPROM,DO       ; check for state of data bit to xmit
0228 2A2B           00153         goto    BitLow          ;
0229 1506           00154         bsf     PORT_B,SDATA    ; set data line high
022A 2A2C           00155         goto    ClkOut          ; go toggle the clock
                    00156
022B 1106           00157 BitLow  bcf     PORT_B,SDATA    ; output a low bit
022C 1586           00158 ClkOut  bsf     PORT_B,SCLK     ; set clock line high
022D 0000           00159         nop
022E 0000           00160         nop
022F 0000           00161         nop
0230 0000           00162         nop
0231 1186           00163         bcf     PORT_B,SCLK     ; return clock line low
                    00164
0232 0008           00165         return                  ; Exit subroutine
                    00166
                    00167 ;*****************************************************
                    00168 ;     BITIN routine reads one bit of data from the
                    00169 ;     serial EE device and stores it in 'DI'
                    00170 ;*****************************************************
                    00171
0233                00172 BitIn
0233 1792           00173         bsf     EEPROM,DI       ; assume input bit is high
0234 30C5           00174         movlw   PORTBRD         ; make sdata an input line
0235 0066           00175         tris    PORT_B
0236 1506           00176         bsf     PORT_B,SDATA    ; set sdata line for input
0237 1586           00177         bsf     PORT_B,SCLK     ; set clock line high
0238 0000           00178         nop                     ; just sit here a sec
0239 0000           00179         nop
023A 0000           00180         nop
023B 0000           00181         nop
023C 0000           00182         nop                     ;
023D 1D06           00183         btfss   PORT_B,SDATA    ; read the data bit
023E 1392           00184         bcf     EEPROM,DI       ; input bit was low

```
MPASM 01.20 Released              MAIN.ASM   8-10-1995  21:07:15        PAGE 34
Dual Level Thermostat Program June, 1995

LOC  OBJECT CODE    LINE SOURCE TEXT
     VALUE 023F 1186           00185       bcf     PORT_B,SCLK     ; set clock line low
                    00186
0240 0008           00187       return                  ; Exit subroutine
                    00188
                    00189 ;*******************************************************
                    00190 ;     Tx Transmit Data Subroutine
                    00191 ;     This routine takes the byte of data stored in the
                    00192 ;     'datao' register and transmits it to the serial EE device.
                    00193 ;     It will then send 1 more clock to the serial EE for the
                    00194 ;     acknowledge bit.
                    00195 ;*******************************************************
0241                00196 Tx
0241 3008           00197       movlw   .8
0242 0098           00198       movwf   COUNT           ; set the #bits to 8
                    00199
0243                00200 TxLp
0243 1312           00201       bcf     EEPROM,DO       ; assume bit out is low
0244 1B97           00202       btfsc   TXBUF,7         ; is bit out really low?
0245 1712           00203       bsf     EEPROM,DO       ; otherwise data bit =1
0246 2225           00204       call    BitOut          ; serial data out
0247 0D97           00205       rlf     TXBUF, 1        ; rotate txbuf left.
0248 0B98           00206       decfsz  COUNT, 1        ; 8 bits done?
0249 2A43           00207       goto    TxLp            ; no - go again
024A 2233           00208       call    BitIn           ; read ack bit
                    00209                               ; device did not pull data low
                    00210
024B 0008           00211       return                  ; Exit subroutine
                    00212
                    00213 ;*******************************************************
                    00214 ;     Rx Receive data routine
                    00215 ;     This routine reads one byte of data from the part
                    00216 ;     into the 'datai' register.  It then sends a high
                    00217 ;     ack bit to indicate that no more data is to be read
                    00218 ;*******************************************************
024C                00219 Rx
024C 0195           00220       clrf    DATAI           ; clear input buffer
024D 3008           00221       movlw   .8              ; set # bits to 8
024E 0098           00222       movwf   COUNT
024F 1003           00223       bcf     STATUS,0        ; make sure carry bit is low
0250                00224 RxLp
0250 0D95           00225       rlf     DATAI, 1        ; rotate datai 1 bit left
0251 2233           00226       call    BitIn           ; read a bit
0252 1B92           00227       btfsc   EEPROM,DI
0253 1415           00228       bsf     DATAI,CARRY     ; set bit 0 if necessary
0254 0B98           00229       decfsz  COUNT, 1        ; 8 bits done?
0255 2A50           00230       goto    RxLp            ; no, do another
0256 1712           00231       bsf     EEPROM,DO       ; set ack bit = 1
0257 2225           00232       call    BitOut          ; to finish transmission
                    00233
```

MPASM 01.20 Released          MAIN.ASM   8-10-1995  21:07:15       PAGE 35
Dual Level Thermostat Program June, 1995

LOC  OBJECT CODE    LINE SOURCE TEXT
     VALUE 0258 0008           00234       return              ; Exit subroutine
                    00235
                    00236 ;****************************************************
                    00237 ;     READ (read routine)
                    00238 ;     This routine reads one address of the
                    00239 ;     serial EE device starting at address in ADDR using
                    00240 ;     random access mode (non-sequential read). Reading
                    00241 ;     the device using the random access mode
                    00242 ;     requires that the address pointer ADDR be set for every
                    00243 ;     byte before the read takes place. The address pointer
                    00244 ;     is set by sending a 'write mode' control byte with the
                    00245 ;     address of the location to read.
                    00246 ;
                    00247 ;     On return:
                    00248 ;             Data is in DATAI and W.
                    00249 ;             ADDR is incremented.
                    00250 ;
                    00251 ;             The SDATA line is left an input.
                    00252 ;
                    00253 ;****************************************************
0259                00254 Read
0259 21FE           00255       call    BStart       ; generate start bit
                    00256
                    00257                            ; now send the write control byte and
                    00258                            ; address to set the pointer
                    00259
025A 30A0           00260       movlw   b'10100000'  ; get slave address (write mode)
025B 0097           00261       movwf   TXBUF        ; into transmit buffer
025C 2241           00262       call    Tx           ; and send it
025D 0814           00263       movf    ADDR,W       ; get word address
025E 0097           00264       movwf   TXBUF        ; into transmit buffer
025F 2241           00265       call    Tx           ; and send it
                    00266
                    00267                            ; now read one byte from the part
                    00268
0260 21FE           00269       call    BStart       ; generate start bit
0261 30A1           00270       movlw   b'10100001'  ; get slave address and read mode
0262 0097           00271       movwf   TXBUF        ; into transmit buffer
0263 2241           00272       call    Tx           ; and transmit it
0264 224C           00273       call    Rx           ; read 1 byte from serial EE
0265 2213           00274       call    BStop        ; send stop bit to end transmission
                    00275
0266 0A94           00276       incf    ADDR, 1      ; add 1 to address counter
                    00277
0267 30C5           00278       movlw   PORTBRD      ; make SDATA an input line
0268 0066           00279       tris    PORT_B
                    00280
0269 0815           00281       movf    DATAI,W      ; get word data
                    00282

MPASM 01.20 Released        MAIN.ASM   8-10-1995  21:07:15      PAGE 36
Dual Level Thermostat Program June, 1995

LOC  OBJECT CODE    LINE SOURCE TEXT
VALUE 026A 0008           00283         return              ; Exit subroutine
                    00284
                    00285
                    00286 ;****************************************************************
                    00287 ;      Byte Write Routine
                    00288 ;      This routine writes the data in "datao" to
                    00289 ;      the serial EE device at address in ADDR.
                    00290 ;      This routine waits 10mS after every
                    00291 ;      byte to give the device time to do the write.
                    00292 ;      On entry:
                    00293 ;              ADDR must contain the address and
                    00294 ;              W must contain the data to be stored.
                    00295 ;      On return:
                    00296 ;              ADDR is incremented.
                    00297 ;
                    00298 ;              The SDATA line is left an input.
                    00299 ;****************************************************************
                    00300
026B 0096           00301 Write   movwf   DATAO        ; Save the Data
026C 3008           00302         movlw   .8           ; set number of bytes
026D 0099           00303         movwf   BCOUNT       ; to write as to 8
                    00304
026E 21FE           00305 Byte    call    BStart       ; generate start bit
026F 30A0           00306         movlw   b'10100000'  ; get slave address (write mode)
0270 0097           00307         movwf   TXBUF        ; into transmit buffer
0271 2241           00308         call    Tx           ; and send it
0272 0814           00309         movf    ADDR,W       ; move word address
0273 0097           00310         movwf   TXBUF        ; into transmit buffer
0274 2241           00311         call    Tx           ; and send it
0275 0816           00312         movf    DATAO,W      ; move data byte
0276 0097           00313         movwf   TXBUF        ; to tranmit buffer
0277 2241           00314         call    Tx           ; and transmit it
0278 2213           00315         call    BStop        ; generate stop bit
                    00316
0279 21F4           00317         call    Wait         ; 10 ms wait after every byte
027A 21F4           00318         call    Wait         ; 10 ms wait after every byte
027B 0A94           00319         incf    ADDR, 1      ; add 1 to address counter
                    00320
027C 30C5           00321         movlw   PORTBRD      ; make SDATA an input line
027D 0066           00322         tris    PORT_B
                    00323
027E 0008           00324         return               ; Exit subroutine
                    00325
                    00326 ;****************************************************************
                    00080 #include eepromrw.asm
                    00001 ; ---------------------------------------------------------------
                    00002
                    00003 ; File Name: EEPROMRW.ASM      EEPROM Read/Write ASM File
                    00004

```
MPASM 01.20 Released            MAIN.ASM  8-10-1995  21:07:15      PAGE 37
Dual Level Thermostat Program June, 1995

LOC  OBJECT CODE    LINE SOURCE TEXT
     VALUE

00005 ; ------------------------------------------------------------
                    00006
                    00007 ; Save the CPU Ram values to EEPROM:
027F                00008 SaveEeprom
                    00009
027F 3000           00010         movlw   0                ; First Address
0280 0094           00011         movwf   ADDR             ; Point to address
                    00012
0281 0827           00013         movf    OCTMPHE, W       ; Index for Occupant Temp Heat Index
0282 226B           00014         call    Write            ; Write the EEPROM data
                    00015
0283 0828           00016         movf    OCTMPCO, W       ; Index for Occupant Temp Cool Index
0284 226B           00017         call    Write            ; Write the EEPROM data
                    00018
0285 0829           00019         movf    OWTMPHE, W       ; Index for Owner Temp Heat Index
0286 226B           00020         call    Write            ; Write the EEPROM data
                    00021
0287 082A           00022         movf    OWTMPCO, W       ; Index for Owner Temp Cool Index
0288 226B           00023         call    Write            ; Write the EEPROM data
                    00024
0289 082B           00025         movf    OWTIMOUT, W      ; Owner Time Out in Minutes
028A 226B           00026         call    Write            ; Write the EEPROM data
                    00027
028B 0008           00028         return                   ; Exit subroutine
                    00029
                    00030 ; ------------------------------------------------------------
                    00031
                    00032 ; Read the saved EEPROM values into CPU Ram:
028C                00033 RecallEeprom
                    00034
028C 3000           00035         movlw   0                ; First Address
028D 0094           00036         movwf   ADDR             ; Point to address
                    00037
028E 2259           00038         call    Read             ; Read the EEPROM data
028F 00A7           00039         movwf   OCTMPHE          ; Index for Occupant Temp Heat Index
                    00040
0290 2259           00041         call    Read             ; Read the EEPROM data
0291 00A8           00042         movwf   OCTMPCO          ; Index for Occupant Temp Cool Index
                    00043
0292 2259           00044         call    Read             ; Read the EEPROM data
0293 00A9           00045         movwf   OWTMPHE          ; Index for Owner Temp Heat Index
                    00046
0294 2259           00047         call    Read             ; Read the EEPROM data
0295 00AA           00048         movwf   OWTMPCO          ; Index for Owner Temp Cool Index
                    00049
0296 2259           00050         call    Read             ; Read the EEPROM data
0297 00AB           00051         movwf   OWTIMOUT         ; Owner Time Out in Minutes
                    00052
0298 0008           00053         return                   ; Exit subroutine
```

```
MPASM 01.20 Released           MAIN.ASM    8-10-1995  21:07:15        PAGE 38
Dual Level Thermostat Program June, 1995

LOC  OBJECT CODE    LINE SOURCE TEXT
  VALUE
                    00054
                    00055 ; ------------------------------------------------------------
                    00081  endif
                    00082
                    00083 ; ------------------------------------------------------------
                    00084
                    00085          end
```

```
MPASM 01.20 Released              MAIN.ASM   8-10-1995  21:07:15      PAGE 39
Dual Level Thermostat Program June, 1995

SYMBOL TABLE
  LABEL                           VALUE

A2D2Index                         000000A8
A2D2Index1                        000000AA
A2D2Index2                        000000B1
A2DTMR                            0000001C
A2DTMRSET                         00000078
ADCON0                            00000008
ADCON1                            00000008
ADCS0                             00000006
ADCS1                             00000007
ADDR                              00000014
ADIE                              00000006
ADIF                              00000001
ADON                              00000000
ADRES                             00000009
AKEYSMASK                         0000001C
BCOUNT                            00000019
BKEYSMASK                         000000C0
BStart                            000001FE
BStop                             00000213
BYCNT                             00000013
BitIn                             00000233
BitLow                            0000022B
BitOut                            00000225
Byte                              0000026E
C                                 00000000
CARRY                             00000000
CHS0                              00000003
CHS1                              00000004
COMPTIMRH                         0000001E
COMPTIMRL                         0000001D
COMPTMRSET                        00000268
COUNT                             00000018
CURINDEX                          0000002E
ClkOut                            0000022C
ColdStart                         00000000
Control                           00000171
ControlCool                       000001AF
ControlDisp                       000001DC
ControlHeat                       0000019B
ControlLast                       000001C3
ControlTemp                       00000186
ConvertCh                         000000EF
ConvertCh0                        000000EE
ConvertCh1                        000000EC
ConvertWait                       000000F2
DATAI                             00000015
DATAO                             00000016
DC                                00000001
DCARRY                            00000001
```

```
MPASM 01.20 Released              MAIN.ASM   8-10-1995  21:07:15      PAGE 40
Dual Level Thermostat Program June, 1995

SYMBOL TABLE
  LABEL                           VALUE

DI                                00000007
DISPCADJ                          00000036
DISPINIT                          00000040
DISPTADJ                          00000040
DO                                00000006
DONE                              00000002
DisplayHexLeft                    000000A4
DisplayHexRight                   000000A6
DoControl                         00000181
DoInit                            000000C9
EEPROM                            00000012
ES                                00000012
FALSE                             00000000
FLAGS                             00000023
FSR                               00000004
GIE                               00000007
GO                                00000002
HTORCOL                           000000C0
HeatCoolKeyOn                     00000127
Hex2SegHi                         00000055
Hex2SegLeft                       00000096
Hex2SegLo                         00000057
Hex2SegRight                      0000009D
IND0                              00000000
INDEX                             00000011
INDF                              00000000
INTCON                            0000000B
INTE                              00000004
INTF                              00000001
IOCTMPCO                          00000012
IOCTMPHE                          0000000C
IOWTIMOUT                         0000000B
IOWTMPCO                          00000014
IOWTMPHE                          00000005
IRP                               00000007
Index2AD                          00000013
Index2BinMin                      00000080
Index2Deg                         00000034
Index2DispMin                     0000006A
InitADPort                        000000E7
InitCPURAM                        000000DA
InitPorts                         000000B3
IntVector                         00000004
KeySwNotOn                        00000141
LCD1                              0000000D
LCD2                              0000000E
LCD3                              0000000F
LCD4                              00000010
LCD_LTR_L                         00000038
```

```
MPASM 01.20 Released           MAIN.ASM   8-10-1995  21:07:15      PAGE 41
Dual Level Thermostat Program June, 1995

SYMBOL TABLE
  LABEL                         VALUE

LCD_LTR_b                       0000007C
LCLK                            00000001
LDATA                           00000002
LOBATCNTS                       00000071
LOBATVOLT                       00000190
LOOPS                           0000001A
LOOPS2                          0000001B
LSB                             00000000
LcdDisplay                      000000FE
Lcd_10                          00000104
Lcd_20                          00000108
LoadTimeout                     000000D6
MAXINDEX                        0000002C
MAXINDX                         00000024
MAXTIMINDEX                     00000013
MAXTMPINDEX                     0000001D
MININDEX                        0000002D
MINTIMINDEX                     00000000
MINTMPINDEX                     00000001
MSB                             00000007
NO                              00000000
NoInit                          000000D0
NoShowLB                        000001DA
OCTMPCO                         00000028
OCTMPHE                         00000027
OPTION_R                        00000001
OWTIMOUT                        0000002B
OWTMPCO                         0000002A
OWTMPHE                         00000029
PA0                             00000005
PA1                             00000006
PA2                             00000007
PC                              00000002
PCFG0                           00000000
PCFG1                           00000001
PCL                             00000002
PCLATH                          0000000A
PD                              00000003
PIC54                           000001FF
PIC55                           000001FF
PIC56                           000003FF
PIC57                           000007FF
PIC71                           00000000
PORTADIR                        0000001F
PORTBRD                         000000C5
PORTBWT                         000000C1
PORT_A                          00000005
PORT_B                          00000006
PORT_C                          00000007
```

```
MPASM 01.20 Released              MAIN.ASM    8-10-1995  21:07:15       PAGE 42
Dual Level Thermostat Program June, 1995

SYMBOL TABLE
  LABEL                           VALUE

POWERON                           00000004
P_DOWN                            00000003
PgmKeyOn                          00000123
ProcTimerInt                      0000000E
ProcessBoth                       0000016B
ProcessDec                        0000015A
ProcessDisp                       0000016C
ProcessInc                        00000154
ProcessKeys                       0000014A
ProcessNew                        00000162
ProcessTemp                       00000169
ProcessTimer                      00000166
Quit                              00000003
RBIE                              00000003
RBIF                              00000000
RP0                               00000005
RP1                               00000006
RTCC                              00000001
Read                              00000259
ReadDispA2D                       000000F7
ReadSwitches                      00000116
RecallEeprom                      0000028C
RefreshLCD                        000001CE
ReloadTimoutTimer                 00000185
Rx                                0000024C
RxLp                              00000250
SAVDHTCO                          0000001F
SAVLCD1                           00000020
SAVLCD2                           00000021
SAVSWA                            00000025
SAVSWB                            00000026
SCLK                              00000003
SDATA                             00000002
STATUS                            00000003
SWADEC                            00000003
SWAINC                            00000002
SWAKEY                            00000004
SWBCOOL                           00000007
SWBHEAT                           00000006
SWPOWER                           00000005
Same                              00000001
SaveEeprom                        0000027F
T0IE                              00000005
T0IF                              00000002
TEMP                              0000000C
TEMP1                             0000000D
TEMP2                             0000000E
TEMP3                             0000000F
TEMP4                             00000010
```

We claim:

1. An energy saving controller for an air conditioning system, the controller comprising:

temperature sensing means for sensing and measuring the temperature in an area to be controlled;

memory means for storing a first set and a second set of reference temperatures, each set of reference temperatures including a heating reference temperature and a cooling reference temperature;

control means in communication with said memory means for selecting one of said first and second sets of reference temperatures in said memory and for comparing the selected set of reference temperatures to the measured temperature of the area, said control means adapted to select one set of reference temperatures when the area is unoccupied by a person and to select the other set of reference temperatures when the area is occupied by a person, said control means in communication with an occupancy detector means for detecting the presence of a person in the area;

adjuster means having a first switch interconnected to said control means for selecting the set of reference temperatures stored in said memory means to be adjusted;

means for increasing and decreasing the reference temperatures selected by the first switch; and system switch means for selecting between a heating mode, a cooling mode, and an off mode, said switch means interconnected with said control means, said control means adapted to actuate a heating unit when the heating mode is selected by said switch means and when the measured temperature of the area falls substantially below the heating temperature set point or actuating a cooling unit when the cooling mode is selected by said switch means and when the measured temperature of the area substantially exceeds the selected cooling temperature set point.

2. A thermostat assembly for controlling the temperature in an area according to claim 1, wherein said first switch comprises a key switch.

3. A thermostat assembly for controlling the temperature in an area according to claim 1, wherein said occupancy detector means comprises an infrared sensor.

4. A thermostat assembly for controlling the temperature in an area according to claim 1, further comprising display means for displaying the temperature set point which corresponds to the mode selected by the system switch means and the temperature measured by said temperature sensing means.

5. A thermostat assembly for controlling the temperature in an area according to claim 1, further comprising a power supply circuit for supplying power to the thermostat assembly, said power supply circuit adapted provide a direct current supply to the thermostat assembly from an alternating current power source, said power supply circuit including a back up direct current power source.

6. A thermostat assembly for controlling the temperature in an area, the control system comprising:

a thermostat assembly including:

sensor means for sensing and measuring the temperature in the area;

system switch means for switching between a heating mode, a cooling mode, and an off mode;

memory means for storing a first occupied set and a second unoccupied set of reference temperature values, each set of reference temperature values including a heating reference temperature value and a cooling reference temperature value;

selector means for selecting one of said first and second sets of reference temperatures stored in said memory means as temperature set points;

a switch to select between the first and second set of reference temperatures having a normal operating position wherein said first occupied set of reference temperatures is selected for adjustment and second position wherein said second unoccupied set of reference temperatures is selected for adjustment;

means to increment or decrement the temperatures selected by the switch;

logic means responsive to said selector means for comparing the selected temperature points to the temperature measured by the sensor means;

actuator means responsive to said logic means for actuating a heating unit when the heating mode is selected by the system switch means and when the measured temperature of the area falls substantially below the heating temperature set point and for actuating a cooling unit when the cooling mode is selected by the system switch means and when the measured temperature of the area substantially exceeds the selected cooling temperature set point, said actuator means responsive to said system switch means; and an occupancy sensor assembly communicating with said selector means of said thermostat assembly, said selector means being adapted to select one set of reference temperatures as the temperature set points when the occupancy detector detects that the area is unoccupied and adapted to select the other set of reference temperatures as the temperature set points when the occupancy detector detects that the area is occupied.

7. A thermostat assembly for controlling the temperature in an area according to claim 6, wherein said occupancy sensor assembly includes an infrared sensor.

8. A thermostat assembly for controlling the temperature in an area according to claim 6, wherein said logic means comprises a micro-controller chip.

9. A thermostat assembly for controlling the temperature in an area according to claim 6, further comprising means for displaying the selected temperature set point that corresponds to the mode selected by the switch means and the temperature measured by said sensor means.

10. A thermostat assembly for controlling the temperature in an area, the control system comprising:

a thermostat assembly including:

temperature sensor means for sensing and measuring the temperature in the area;

a first switch for switching between a heating mode, a cooling mode, and an off mode;

a second switch for switching between an automatic mode and a fan-on mode;

memory means for storing a first set and a second set of reference temperature values, each set of reference temperature values including a heating reference temperature value and a cooling reference temperature value;

selector means for selecting one of said first and second sets of reference temperatures stored in said memory means as temperature set points;

a third switch for selecting a stored reference temperature value to be adjusted;

adjustor means for adjusting the stored reference temperature value as selected by the third switch;

logic means responsive to said selector means for comparing the selected temperature set points to the temperature measured by the sensor means;

actuator means responsive to said logic means for actuating a heating unit when the heating mode is selected by said first switch and when the measured temperature of the area falls substantially below the heating temperature set point or actuating a cooling unit when the cooling mode is selected by said first switch and when the measured temperature of the area substantially exceeds the selected cooling temperature set point; and an occupancy sensor assembly communicating with said selector means of said thermostat assembly, said selector means being adapted to select one set of reference temperatures as the temperature set points when the occupancy detector detects that the area is unoccupied and adapted to select the other set of reference temperatures as the temperature set points when the occupancy detector detects that the area is occupied.

11. A thermostat assembly for controlling the temperature in an area according to claim 10, wherein said occupancy sensor comprises an infrared sensor.

12. A thermostat assembly for controlling the temperature in an area according to claim 10, wherein said logic means comprises a micro-controller chip.

13. A thermostat assembly for controlling the temperature in an area according to claim 10, wherein said third switch comprises a key switch.

14. A value adjustment mechanism for a thermostat, said thermostat having a memory means for storing a first and second set of reference temperature values, each said set including a heating and cooling reference temperature value, the value adjustment mechanism comprising:

a system switch for selecting heating or cooling modes;

a selector switch for selecting between the first and second set of reference temperature values;

a temperature selection means to increment or decrement the temperature value selected by the system and selector switches; and a means for monitoring said system and selector switches and said temperature selection means to permit adjustment of said stored reference temperature values.

15. A method of temperature value adjustment on a thermostat having a memory means for storing a first occupied and second unoccupied set of reference temperature values, each set including a heating and cooling reference temperature value, said method comprising the steps of:

actuating a switch to select between the first and second sets of reference temperatures, said switch having a normal operating position wherein said first occupied set of reference temperatures is selected for adjustment and a second position wherein said second unoccupied set of reference temperatures is selected for adjustment;

establishing reference temperatures for the second unoccupied set of reference temperatures;

actuating the switch such that the reference temperatures for said second unoccupied set of reference temperatures can not be changed by unauthorized personnel;

selecting between a heating and cooling mode; and selecting said first occupied set of reference temperatures if a source of heat is detected indicating that an area is occupied, and selecting said second unoccupied set of reference temperatures if a source of heat is not detected indicating that the area is not occupied.

16. A method of temperature value adjustment as in claim 15, wherein the step of actuating a switch to select between the first and second sets of reference temperatures comprises the step of:

turning a key switch.

* * * * *